US010771406B2

(12) United States Patent
Bansal et al.

(10) Patent No.: US 10,771,406 B2
(45) Date of Patent: Sep. 8, 2020

(54) PROVIDING AND LEVERAGING IMPLICIT SIGNALS REFLECTING USER-TO-BOT INTERACTION

(71) Applicant: Microsoft Technology Licensing, LLC, Redmond, WA (US)

(72) Inventors: Chetan Bansal, Seattle, WA (US); Anantha Deepthi Uppala, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 15/810,049

(22) Filed: Nov. 11, 2017

(65) Prior Publication Data

US 2019/0149488 A1 May 16, 2019

(51) Int. Cl.
*H04L 12/58* (2006.01)
*G06F 9/451* (2018.01)
*H04L 29/08* (2006.01)

(52) U.S. Cl.
CPC .............. *H04L 51/02* (2013.01); *G06F 9/453* (2018.02); *H04L 67/22* (2013.01); *H04L 51/14* (2013.01); *H04L 67/32* (2013.01)

(58) Field of Classification Search
CPC ......... H04L 51/02; H04L 67/22; H04L 67/32; G06F 9/453
USPC ........................................................ 709/206
See application file for complete search history.

(56) References Cited

U.S. PATENT DOCUMENTS

| 6,263,358 | B1 | 7/2001 | Lee et al. |
| 6,499,021 | B1 | 12/2002 | Abu-Hakima |
| 7,139,798 | B2 | 11/2006 | Zircher et al. |
| 7,562,115 | B2 | 7/2009 | Zircher et al. |

(Continued)

FOREIGN PATENT DOCUMENTS

| EP | 1190339 B1 | 7/2005 |
| WO | 2014197635 A2 | 12/2014 |

(Continued)

OTHER PUBLICATIONS

Mariya Yao, Top 6 Conversational Skills to Teach Your Chatbots, Sep. 13, 2016, www.medium.com, https://medium.com/topbots/top-6-conversational-skills-to-teach-your-chatbots-ec4eb019a23d (Year: 2016).*

(Continued)

*Primary Examiner* — Zi Ye

(57) ABSTRACT

A technique is described herein for providing implicit quality signals over a span of time that reflect quality of service provided by a collection of BOTs to a group of users. The technique can then leverage these implicit quality signals in various application-phase uses. In one use, an abandonment-determination component can leverage the implicit quality signals to provide an output result which indicates whether a current user has abandoned use of a current BOT with which he or she has been interacting, or is about to abandon use of that current BOT. In another use, a search engine or a recommendation engine can use the implicit quality signals to help identify an appropriate BOT for use by the current user. The implicit quality signals can include: one of more user-behavior implicit signals; one of more BOT-behavior implicit signals; and/or one of more transaction-summary implicit signals.

19 Claims, 12 Drawing Sheets

(56) References Cited

U.S. PATENT DOCUMENTS

| | | | |
|---|---|---|---|
| 9,327,194 | B2 | 5/2016 | Douceur et al. |
| 9,401,989 | B2 | 7/2016 | Uba et al. |
| 9,699,239 | B1 | 7/2017 | Hays et al. |
| 9,761,222 | B1* | 9/2017 | Scarasso .................. G10L 15/07 |
| 10,381,006 | B1 | 8/2019 | Eriksson et al. |
| 2003/0046118 | A1 | 3/2003 | O'Donnell |
| 2003/0182391 | A1* | 9/2003 | Leber .................... G06F 16/951 |
| | | | 709/217 |
| 2008/0089490 | A1* | 4/2008 | Mikkonen ......... G06F 16/90332 |
| | | | 379/88.14 |
| 2008/0120421 | A1 | 5/2008 | Gupta et al. |
| 2009/0043637 | A1 | 2/2009 | Eder |
| 2009/0292778 | A1* | 11/2009 | Makar .................... G06N 20/00 |
| | | | 709/206 |
| 2010/0296417 | A1 | 11/2010 | Steiner |
| 2015/0074027 | A1 | 3/2015 | Huang et al. |
| 2016/0358240 | A1* | 12/2016 | Redfern ............. G06Q 30/0619 |
| 2017/0017635 | A1 | 1/2017 | Leliwa et al. |
| 2017/0048170 | A1 | 2/2017 | Smullen et al. |
| 2017/0180284 | A1* | 6/2017 | Smullen ................ H04L 67/322 |
| 2017/0288942 | A1 | 10/2017 | Plumb et al. |
| 2017/0289305 | A1 | 10/2017 | Liensberger et al. |
| 2017/0293834 | A1 | 10/2017 | Raison et al. |
| 2018/0150524 | A1 | 5/2018 | Anger et al. |
| 2019/0089655 | A1 | 3/2019 | Uppala et al. |

FOREIGN PATENT DOCUMENTS

| | | | | |
|---|---|---|---|---|
| WO | 2017070126 | A1 | 4/2017 | |
| WO | WO-2017070126 | A1 * | 4/2017 | ............. H04L 29/08 |
| WO | 2017112796 | A1 | 6/2017 | |
| WO | WO-2017112796 | A1 * | 6/2017 | ............. H04L 51/02 |

OTHER PUBLICATIONS

Nicole Radziwill, Evaluating Quality of Chatbots and Intelligent Conversational Agents, Apr. 2017, www.researchgate.net, https://www.researchgate.net/publication/316184347_Evaluating_Quality_of_Chatbots_and_Intelligent_Conversational_Agents (Year: 2017).*

International Search Report and Written Opinion Issued in PCT Application No. PCT/US2018/058820, dated Feb. 13, 2019, 14 pages.

International Search Report and Written Opinion Issued in PCT Application No. PCT/US2018/040667, dated Oct. 26, 2018, 16 pages.

Bibliographic data for EP1190339 A2, available at <<https://worldwide.espacenet.com>>, application published Mar. 27, 2002, inventor Suhayya Abu-Hakima, retrieved from Espacenet Patent search on Jan. 7, 2019, 2 pages.

Non-final Office Action issued in U.S. Appl. No. 15/705,299, dated May 2, 2019, 33 pages.

Coumau, et al., "A smart home is where the bot is," avaiable at <<http://www.mckinsey.com/business-functions/digital-mckinsey/our-insights/a-smart-home-is-where-the-bot-is>>, in McKinsey Quarterly, Jan. 2017, 9 pages.

Mamei, et al., "Motion Coordination in the Quake 3 Arena Environment: A Field-Based Approach," available at <<https://books.google.co.in/books?id=Rzz3BwAAQBAJ&pg=PA265&lpg=PA265&dq20a%20team%20of%20bots&f=false#v=onepage&q&f=false>>, Google Books excerpt, from Proceedings of the First International Conference on Environments for Multi-Agent Systems, LNCS, vol. 3374, Springer-Verlag, p. 265.

Cook, AI, "Using Bots to Route Customer Requests Based on Sentiment and Emotion," available at <<https://www.twilio.com/blog/2016/10/using-bots-to-route-customer-requests-based-on-sentiment-and-emotion.html>>, in Twilio Blog, Oct. 12, 2016, 8 pages.

"Slack API," available at <<https://api.slack.com/bot-users>>, Slack Technologies, Inc., San Francisco, CA, accessed on Sep. 6, 2017, 15 pages.

"How the Bot Framework works," available at <<https://docs.microsoft.com/en-us/bot-framework/overview-how-bot-framework-works>>, Microsoft Corporation, Redmond, WA, Aug. 4, 2017, 5 pages.

Surmenok, Pavel, "Power of Bot Discovery in Google Assistant," available at <<https://chatbotslife.com/power-of-bot-discovery-in-google-assistant-cb172704348a>>, Chatbot's Life, Medium, Jan. 22, 2017, 5 pages.

Rodriguez, Jesus, "Analytics, Integration, Language Understanding: The Bot Ecosystem is Exploding," available at <<https://chatbotsmagazine.com/analytics-integration-language-understanding-the-bot-ecosystem-is-exploding-cb60aed2524e>>, Chatbots Magazine, Medium, Jul. 13, 2016, 4 pages.

Rodriguez, Jesus, "Some thoughts About Bot Discovery," available at <<https://medium.com/@jrodthoughts/some-thoughts-about-bot-discovery-d9c4a554d2a7>>, Medium, Nov. 18, 2016, 4 pages.

Johnson, Khari, "Microsoft's plan to create a bot search engine," available at <<https://venturebeat.com/2016/10/22/microsofts-plan-to-create-a-bot-search-engine/>>, VentureBeat, Oct. 22, 2016, 4 pages.

Constine, Josh, "Facebook Messenger launches group bots and bot discovery tab," available at <<https://techcrunch.com/2017/04/18/facebook-bot-discovery/>>, TechCrunch, Apr. 18, 2017, 8 pages.

Boutin, Paul, "There's a Bot for That! A Search Engine for Finding Bots," available at <<https://web.archive.org/web/20170920171927/https:/chatbotsmagazine.com/theres-a-bot-for-that-a-search-engine-for-finding-bots-8a2c1145072b>>, Chatbots Magazine, Medium, Mar. 14, 2017, 2 pages.

Merritt, Arte, "Dashbot Partners with Google to Provide Analytics and Actionable Insights for Google Assistant," available at <<https://chatbotsmagazine.com/dashbot-partners-with-google-to-provide-analytics-and-actionable-insights-for-google-assistant-7f03d6ebb6f1>>, Chatbots Magazine, Medium, Dec. 8, 2016, 2 pages.

Yeung, Ken, "Dashbot now helps bot developers building on Google Assistant measure what works," available at <<https://venturebeat.com/2016/12/08/dashbot-now-helps-bot-developers-building-on-google-assistant-measure-what-works/>>, VentureBeat, Dec. 8, 2016, 6 pages.

Uppala, et al., "Capturing and Leveraging Signals Reflecting BOT-to-BOT Delegation," U.S. Appl. No. 15/705,299, filed Sep. 15, 2017, 75 pages.

Final Office Action issued in U.S. Appl. No. 15/705,299, dated Nov. 15, 2019, 29 pages.

Office Action issued in U.S. Appl. No. 15/705,299, dated Mar. 23, 2020, 32 pages.

Ju, et al., "The Design of Implicit Interactions: Making Interactive Objects Less Obnoxious," available at https://web.archive.org/web/20120305144212/http://www-cdr.stanford.edu/~wendyju/publications/Ju-DesignOfImplicitInteractions.pdf, draft of paper published in Design Issues: Special Issue on Design Research in Interaction Design, 24(3), 2008, web crawl date identified by the WayBack Machine: Mar. 5, 2012, 17 pages.

* cited by examiner

OVERVIEW OF OPERATION OF THE SIGNAL-PROVIDING PROCESS
1202

PROVIDE IMPLICIT QUALITY SIGNALS OVER A SPAN OF TIME THAT REFLECT QUALITY OF SERVICE PROVIDED BY A COLLECTION OF BOTS TO A GROUP OF USERS, THE SIGNAL-PROVIDING OPERATION INVOLVING CAPTURING TRANSACTION INFORMATION RELATED TO TRANSACTION-RELATED EVENTS THAT OCCUR OVER A COURSE COMMUNICATION BETWEEN THE GROUP OF USERS AND THE BOTS
1204

STORE THE IMPLICIT QUALITY SIGNALS IN A SIGNAL DATA STORE
1206

FIG. 12

OVERVIEW OF OPERATION OF THE ABANDONMENT-ASSESSMENT PROCESS
1302

RECEIVE ONE OR MORE CURRENT-TRANSACTION IMPLICIT QUALITY SIGNALS PRODUCED IN A COURSE OF INTERACTION BETWEEN A CURRENT USER AND A CURRENT BOT, WHEREIN EACH CURRENT-TRANSACTION IMPLICIT SIGNAL REFLECTS A QUALITY OF SERVICE PROVIDED BY THE CURRENT BOT TO THE CURRENT USER
1304

USES AN ABANDONMENT-DETERMINATION COMPONENT TO MAP THE CURRENT-TRANSACTION IMPLICIT QUALITY SIGNAL(S) TO AN OUTPUT RESULT, THE OUTPUT RESULT CONSTITUTING A BOT-RECOMMENDATION EVENT
1306

FIG. 13

OVERVIEW OF OPERATION OF THE TRAINING PROCESS
1402

TRAIN A MACHINE-TRAINED MODEL BASED ON THE IMPLICIT QUALITY SIGNALS
1404

TRANSFER THE MACHINE-TRAINED MODEL TO A SIGNAL-UTILIZING COMPONENT FOR USE BY THE SIGNAL-UTILIZING COMPONENT
1406

FIG. 14

OVERVIEW OF OPERATION OF THE SEARCH PROCESS
1502

RECEIVE AN INPUT QUERY FROM A CURRENT USER
1504

IDENTIFY AT LEAST ONE SELECTED BOT IN THE COLLECTION OF BOTS BY MATCHING THE INPUT QUERY AGAINST INFORMATION PERTAINING TO A GROUP OF AVAILABLE BOTS, TO PROVIDE A SEARCH RESULT. THE IDENTIFYING OPERATION IS BASED, IN PART, ON THE IMPLICIT QUALITY SIGNALS PROVIDED IN THE SIGNAL DATA STORE
1506

SEND AN ELECTRONIC MESSAGE TO A USER COMPUTING DEVICE ASSOCIATED WITH THE CURRENT USER, THE ELECTRONIC MESSAGE CONVEYING THE SEARCH RESULT
1508

INVOKE A SELECTED BOT IN RESPONSE TO A BOT ACTIVATION EVENT
1510

FIG. 15

OVERVIEW OF OPERATION OF THE RECOMMENDATION PROCESS
1602

DETECT A BOT-RECOMMENDATION EVENT IN A COURSE OF AN INTERACTION BETWEEN A CURRENT USER AND A CURRENT BOT, OR IN THE COURSE OF THE CURRENT USER PERFORMING ANY OTHER TRANSACTION. THE CURRENT BOT CORRESPONDS TO A COMPUTER-IMPLEMENTED AGENT THAT PROVIDES A SERVICE TO THE CURRENT USER
1604

IN RESPONSE TO THE BOT-RECOMMENDATION EVENT, IDENTIFY AT LEAST ONE RECOMMENDED BOT IN A COLLECTION OF BOTS, TO PROVIDE A RECOMMENDATION RESULT. THE IDENTIFYING OPERATION IS BASED, IN PART, ON IMPLICIT QUALITY SIGNALS PROVIDED IN A SIGNAL DATA STORE.
1606

SEND AN ELECTRONIC MESSAGE TO A USER COMPUTING DEVICE ASSOCIATED WITH THE CURRENT USER, THE ELECTRONIC MESSAGE CONVEYING THE RECOMMENDATION RESULT PROVIDED BY THE RECOMMENDATION ENGINE
1608

INVOKE A SELECTED BOT IN RESPONSE TO A BOT ACTIVATION EVENT
1610

FIG. 16

PROVIDING AND LEVERAGING IMPLICIT SIGNALS REFLECTING USER-TO-BOT INTERACTION

BACKGROUND

A BOT refers to a computer-implemented agent that provides a service to a user. For example, a hotel may provide an Internet-accessible BOT to assist a user in reserving a hotel room through a conversational "chatbot" interface or some other type of interface. Presently, there are a large number of BOTs from which a user may choose in performing a given task. Moreover, this number can be expected to increase with the growing popularity of BOTs. While this trend increases the breadth of services available to users, it may also lead to complications. For instance, a user may have difficulty finding and accessing BOTs that have sought-after capabilities in an efficient manner.

SUMMARY

A technique is described herein that involves providing implicit quality signals over a span of time that reflect quality of service provided by the collection of BOTs to a group of users. The signals are "implicit" in the sense that they indirectly gauge the users' satisfaction with the services provided by the BOTs based on transaction-related events that occur in course of interaction between the users and the BOTs, without asking the users to provide explicit rating-type information or other type of explicit feedback. The technique then leverages these implicit quality signals for various application-phase uses.

For example, in one use, a search engine or a recommendation engine can use the implicit quality signals to help identify an appropriate BOT for use by a current user. In one scenario, the recommendation engine initiates its operation when it receives a BOT-recommendation event from an abandonment-determination component. That event informs the recommendation engine that the current user has likely abandoned use of a current BOT or is about to discontinue use of the current BOT, and therefore may benefit from a suggestion that identifies another BOT that can be used to complete the user's task at hand. The abandonment determination component includes decision logic which is trained (or otherwise predicated) on the implicit quality signals.

The implicit quality signals can include: one of more user-behavior implicit signals, each of which describes one or more actions taken by a given user in interacting with a given BOT; one of more BOT-behavior implicit signals, each of which describes one or more actions taken by the given BOT in interacting with the given user; and/or one of more transaction-summary implicit signals, each of which describes a characteristic of at least one complete multi-turn transaction between the given user and the given BOT.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 12 shows an overview of a signal-providing process performed by the signal-providing component of FIG. 7.

FIG. 13 shows an overview of an abandonment-assessment process performed by the abandonment-determination component of FIG. 8.

FIG. 14 shows a training process performed by the computing system of FIG. 1, used to generate one or more machine-trained models based, in part, on the provided implicit quality signals.

FIG. 15 shows an overview of a search process performed by the search engine of FIG. 9.

FIG. 16 shows an overview of a recommendation process performed by the recommendation engine of FIG. 10.

Figure 1:
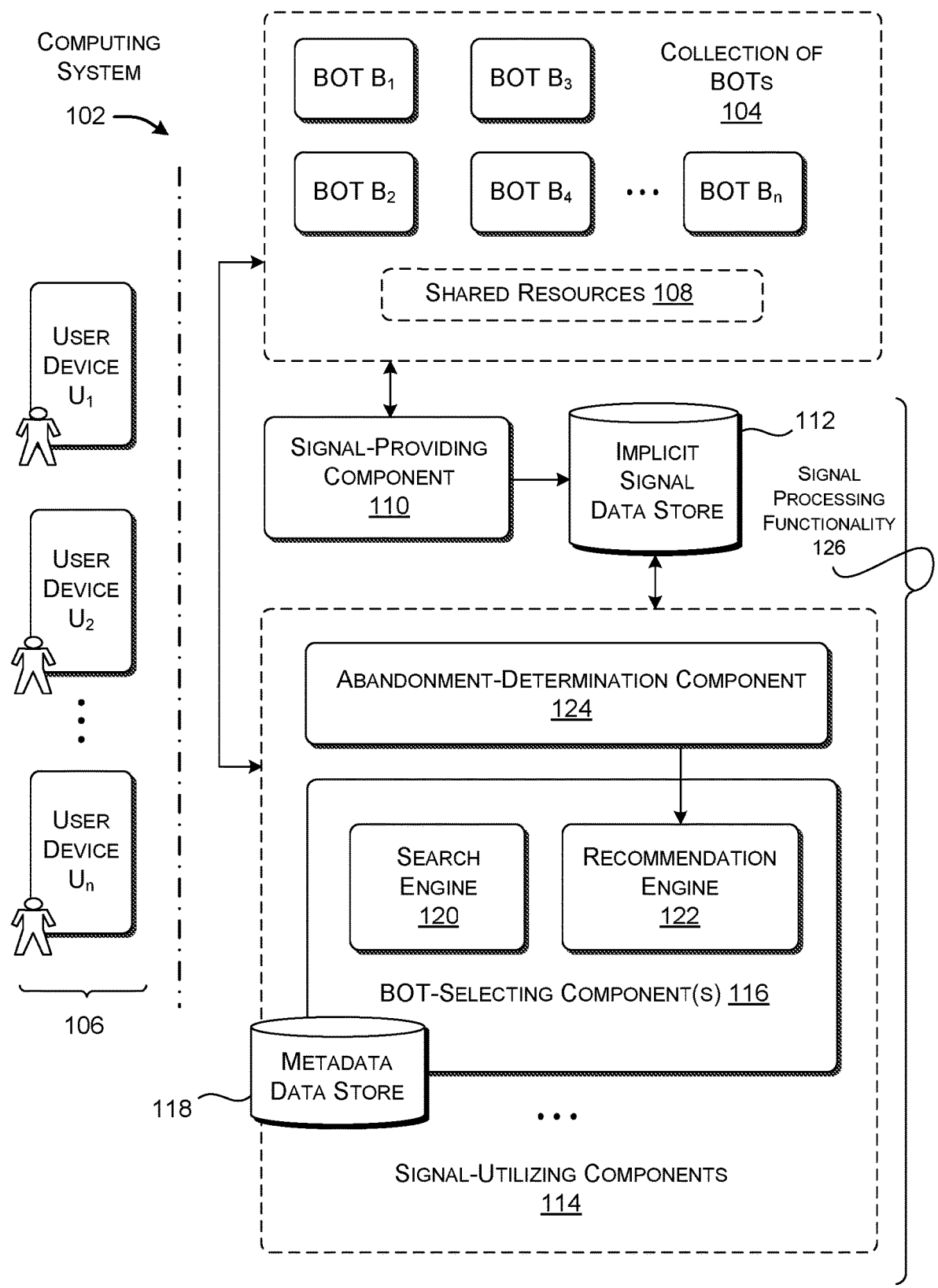
FIG. 1 shows an illustrative computing system for providing and utilizing implicit quality signals.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing system for providing and leveraging implicit quality signals. Section B sets forth illustrative methods which explain the operation of the computing system of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The terms "component," "unit," "element," etc. refer to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing System

A.1. Overview

FIG. 1 shows a computing system 102 that includes a collection of BOTs 104. A BOT, which is a variant of the word "robot," refers to a computer-implemented agent that provides any service to a user in response to input information provided by the user. For instance, one kind of BOT can assist the user in making a reservation to a restaurant. Another type of BOT can help a user in performing a financial transaction. Another type of BOT can guide a user in installing a software product, and so on. The user may interact with any such BOT using a conversational-type interface, or any other type of interface. No constraint is placed herein on the task(s) that a BOT may perform, and the manner in which it performs those tasks. Additional information regarding the composition of one kind of representative BOT is provided below in Subsection A.6. Any number of users may interact with the BOTs via respective user computing devices 106.

In one implementation, the computing system 102 provides a single computing platform which hosts the collection of BOTs 104. A single entity may administer the computing platform. Different creators of BOTs may submit their BOTs to the computing platform. A user may access the collection of BOTs 104 by interacting with the single computing platform. For example, the user may search for a desired BOT by accessing a network site associated with the single computing platform, and, upon finding the desired BOT, invoke it. In other implementations, the computing system 102 includes two or more computing platforms for hosting different respective subsets of BOTs.

A computing platform can optionally host shared resources 108 for use by the BOTs 104. Without limitation, in one implementation, the shared resources 108 can include a BOT connector component that allows users to interact with any BOT in the computing platform via any selected communication channel(s). Illustrative communication channels include: a website-enabled interface; an Email interface; a messaging application interface (such as, without limitation, the SLACK application provided by Slack Technologies, Inc., of San Francisco, Calif., or the SKYPE application provided by Microsoft Corporation of Redmond, Wash., etc.); a personal digital assistant interface (such as the CORTANA assistant provided by Microsoft Corporation), and so on. For instance, assume that a communication channel is set up that is associated with a particular communication application X, for the purpose of interacting with a given BOT Y. The connector component thereafter acts as a go-between, that is, by transferring electronic messages from a user (via the communication application X) and the given BOT Y, and by transferring messages from the given BOT Y to the user (via the particular communication application X). The shared resources 108 can also optionally include various common services that may be relied on by any BOT, such as speech recognition services, language translation services, entity extraction services, etc.

In other cases, each BOT corresponds to a standalone entity that hosts all its functionality and services, e.g., without reliance on common resources. In that context, each developer may create a custom BOT for use with respect to one or more communication channels, and then upload the BOT to a computing platform where it can be accessed by users using those communication channels.

A signal-providing component 110 provides implicit quality signals that reflect the quality of service provided by the BOTs 104 to a group of users, and stores those implicit quality signals in an implicit signal data store 112. The signal-providing component 110 performs this task by capturing transaction information related to transaction-related events (described below in Subsection A.2) that occur over a course of communication between the users and the BOTs 104, and providing implicit quality signals that characterize those transaction-related events. More specifically, the signals are qualified as being "implicit" because they express a user's level of satisfaction with a given BOT in indirect fashion, that is, by expressing characteristics of the interactions between the user and the given BOT, from which the user's level of satisfaction may be surmised. This is in contrast to explicit quality signals that capture explicit rating-type information or other explicit feedback provided by a user.

In one implementation, the signal-providing component 110 provides three categories of implicit quality signals: one of more user-behavior implicit signals; one of more BOT-behavior implicit signals; and transaction-summary implicit signals. Each user-behavior implicit signal describes one or more actions taken by a given user in interacting with a given BOT. Each BOT-behavior implicit signals describes one or more actions taken by the given BOT in interacting with the given user. Each transaction-summary implicit signal describes a characteristic of at least one complete multi-turn transaction between the given user and the given BOT. More generally, each such signal has an implicit bearing on quality of service provided by a given BOT. Subsection A.2 (below) provides examples of each category of the above-described implicit quality signals.

One or more signal-utilizing components 114 perform various functions based, in part, on the signals stored in the implicit signal data store 112. For instance, one or more BOT-selecting components 116 perform the general task of selecting one or more candidate BOTs from a larger collection of BOTs that are described in a metadata data store 118. The BOT-selecting components 116 rely, in part, on the implicit quality signals in the implicit signal data store 112 to help identify suitable candidate BOTs.

FIG. 1 identifies two kinds of BOT-selecting components: a search engine 120 and a recommendation engine 122. The search engine 120 performs a BOT-related search based on an input query submitted by a user via a user computing device. The search engine 120 performs this search based on various feature values (henceforth, simply "features"). At least one kind of feature is based on the implicit quality signals provided in the implicit signal data store 112. Subsection A.4 (below) provides additional information regarding the composition and operation of the search engine 120.

The recommendation engine 122 provides recommendations to a user in the context of one or more reference BOTs. For example, the reference BOT may correspond to a BOT with which the user is currently interacting, or at least viewing. That BOT is referred to hereinafter as the current BOT. For instance, the recommendation engine 122 recommends one or more candidate BOTs that are suitable replacements for the current BOT. In other circumstances, the recommendation engine 122 recommends one or more candidate BOTs that are suitable complements to the current BOT, and so on. Like the search engine 120, the recommendation engine 122 generates its recommendations based on various features. At least one kind of feature is based on the implicit quality signals in the implicit signal data store 112. Subsection A.5(below) provides additional information regarding the composition and operation of the recommendation engine 122.

The signal-utilizing components 114 also optionally include an abandonment-determination component 124. The abandonment-determination component 124 receives various implicit quality signals in the course of a current user interacting with a current BOT. These contemporaneous implicit quality signals are referred to below as current-transaction implicit quality signals to help distinguish these signals from the larger collection of implicit quality signals stored in the implicit signal data store 112. The abandonment-determination component 124 then maps the current-transaction implicit quality signals to an output score. That score reflects a likelihood that the current user has abandoned interaction with the current BOT, or will soon abandon interaction with the current BOT. The abandonment-determination component 124 can perform this mapping operation using a machine-trained model, a rules-based system, or some other technology. Subsection A.3 (below) provides additional information regarding the composition and operation of the abandonment-determination component 124.

From the standpoint of the recommendation engine 122, the act by the abandonment-determination component 124 of generating an output score constitutes a recommendation event. The recommendation engine 122 responds to the recommendation event by generating a suggestion to the user as to one or more other BOTs that the user may use to continue whatever transaction has (or will be) terminated with the current BOT. For example, assume that the user is interacting with a current BOT that corresponds to a first hotel-related BOT, e.g., which assists the current user in making a reservation to a hotel. The abandonment-determination component 124 can detect when the user has reached an impasse (or is about to reach an impasse) with the first hotel-related BOT. In response to this event, the recommendation engine 122 might recommend a second hotel-related BOT, thereby inviting the current user to continue his or her transaction using the second hotel-related BOT.

In some implementations, the abandonment-determination component 124 or the recommendation engine 122 can then transfer state information from the first hotel-related BOT to the second hotel-related BOT. This state information conveys whatever information that the current user has provided to the first hotel-related BOT. This eliminates the need for the current user to resupply the same information to the second hotel-related BOT.

The above-identified signal-utilizing components 114 are described by way of example, not limitation. Other implementations can provide other components that rely on the implicit quality signals in the implicit signal data store 112 to perform various functions.

This description generally refers to the signal-providing component 110, the implicit signal data store 112, and the signal-utilizing components 114 as signal processing functionality 126. As will be described in Subsection A.2, the signal processing functionality 126 can be performed by different agents within the computing system 102 of FIG. 1.

Generally, the signal-utilizing components 116 facilitate the ability of users to interact with BOTs in an efficient manner. For example, the search engine 120 and the recommendation engine 122 can provide more relevant output results to the users by taking into consideration the implicit quality signals. This feature makes it easier for the users to identify appropriate BOTs for the users' intended tasks. For instance, this feature may allow a user to shorten the amount of time that he or she spends looking for desired BOTs and/or reduce the amount of input actions that are required to find and invoke the desired BOTs (compared to the same operations without the use of the implicit quality signals). Further, this feature helps users discover new BOTs which they may not have been aware of. Moreover, the computing system 102 benefits from the efficient operations performed by users by consuming its resources (e.g., its processing, memory, communication resources, etc.) in an efficient manner.

Further, the signal-providing component 110 can provide the implicit quality signals without asking the users to enter explicit rating information or the like. This manner of operation reduces the burden placed on the users in interacting with the computing system 102.

Further, the abandonment-determination component 124 operating in conjunction the recommendation engine 122 allows a user to more seamlessly transit from an unsatisfactory current BOT to a potentially more satisfactory new BOT. That is, this functionality can allow the user to make this transition in an efficient amount of time, and by performing an efficient number of input actions.

Note that FIG. 1 illustrates the signal-utilizing components 116 as being separate and distinct from the collection of BOTs 104. While this indeed represents one implementation, in other cases, any function attributed to a signal-utilizing component can be performed by a BOT and/or some other component within the computing system 102, in whole or in part. For instance, a hotel-related BOT can incorporate a hotel-specific recommendation engine.

Figure 2:
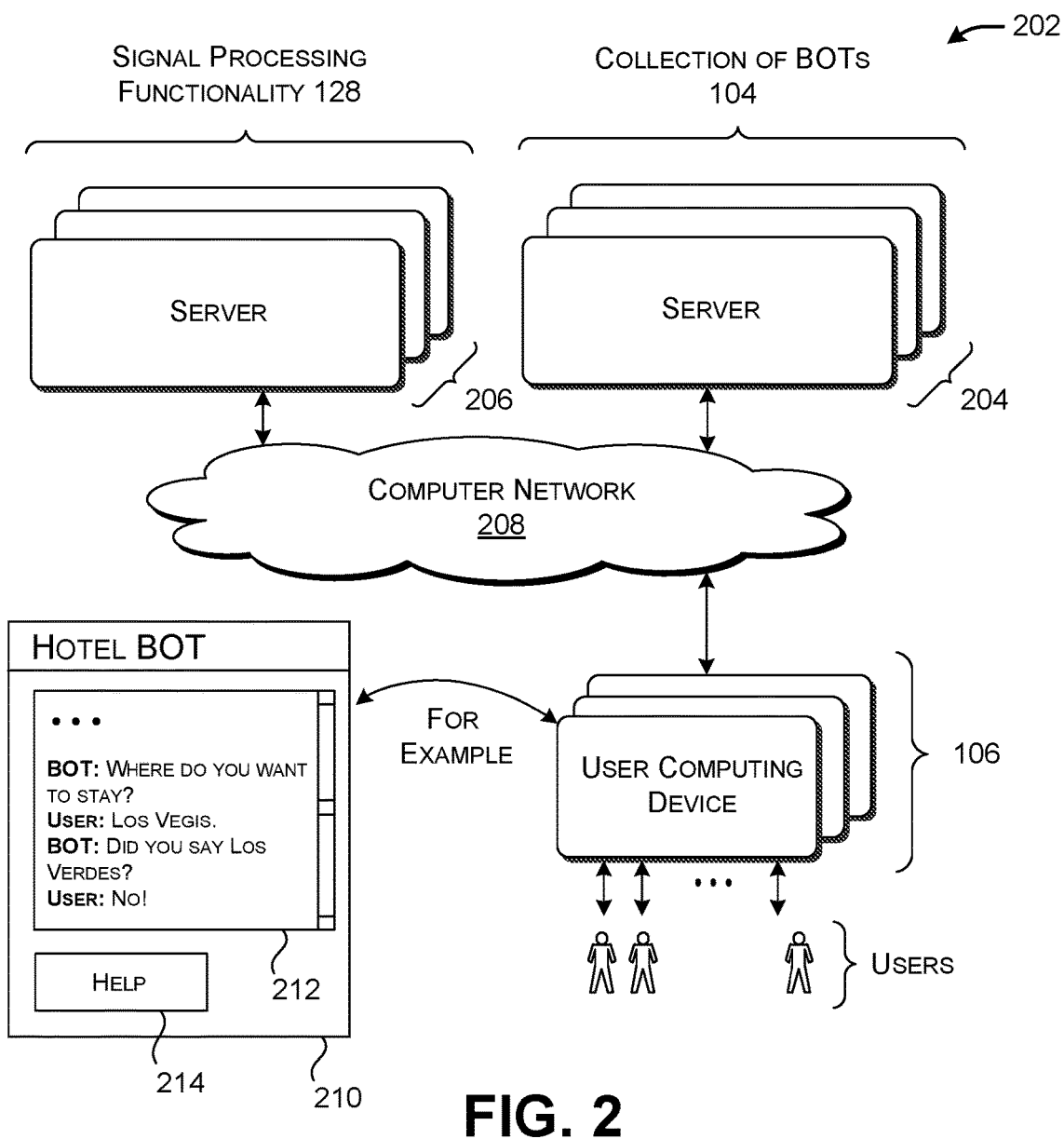
FIG. 2 shows illustrative computing equipment for implementing the computing system of FIG. 1.

FIG. 2 shows computing equipment 202 that can be used to implement the computing system 102 of FIG. 1. In one implementation, the computing equipment 202 can include one or more servers 204 that implement the BOTs 104. The servers 204 may be associated with a single computing platform hosted by a single entity. Or the servers 204 may be associated with two or more computing platforms, potentially administered by two or more respective entities.

The computing equipment 202 may provide one or more other servers 206 (or other type(s) of computing devices) that implement the signal processing functionality 126. Alternatively, the computing equipment 202 can use the same servers for implementing the signal processing functionality 126 and at least some of the BOTs 104. In some cases, a single entity administers both the signal processing functionality 126 and the BOTs 104. In other cases, the entity which administers the signal processing functionality 126 differs from the entity which administers at least some of the BOTs 104.

A plurality of user computing devices 106 interact with the server(s) 204 that host the BOTs 104, as well as the server(s) 206 that host the signal processing functionality 126, via a computer network 208. Any user computing device can correspond to, without limitation, any of: a desktop computing device; a laptop computing device; a smartphone; a tablet-type computing device; a set-top box; a game console; a virtual/augmented reality device; a wearable computing device, and so on. The computer network 208 can correspond to a wide area network (e.g., the Internet), a local area network, one or more point-to-point links, etc.

FIG. 2 also shows an illustrative user interface presentation 210 provided by a BOT, or by a combination of a current BOT and a particular communication channel (such as a particular messaging application). The illustrative user interface presentation 210 can include a panel 212 for displaying the course of dialog between the current BOT and a current user. This particular dialog indicates that the current user is having some trouble with the transaction, e.g., because the current BOT is misinterpreted the user's answers. The illustrative user interface presentation 210 includes a help command 214 that a user may activate to seek assistance with the transaction. In other implementations, some or all of the interaction between the current user and the current BOT can be carried out using a speech-enabled interface.

The signal processing functionality 126 can be distributed among one or more parts of the computing system 102 of FIG. 1. Generally, in some implementations, the signal processing functionality 126 represents part of a computing platform that hosts the BOTs 104. Alternatively, or in addition, the signal processing functionality 126 represents a computing system (not shown) that is external to the computing platform which hosts the BOTs 104. Alternatively, or in addition, at least some parts of the signal processing functionality 126 can be implemented by a given BOT. Alternatively, or in addition, at least some parts of the signal processing functionality 126 can be implemented by a local computing device, and so on. FIGS. 3-6 illustrate these respective options.

Figure 3:
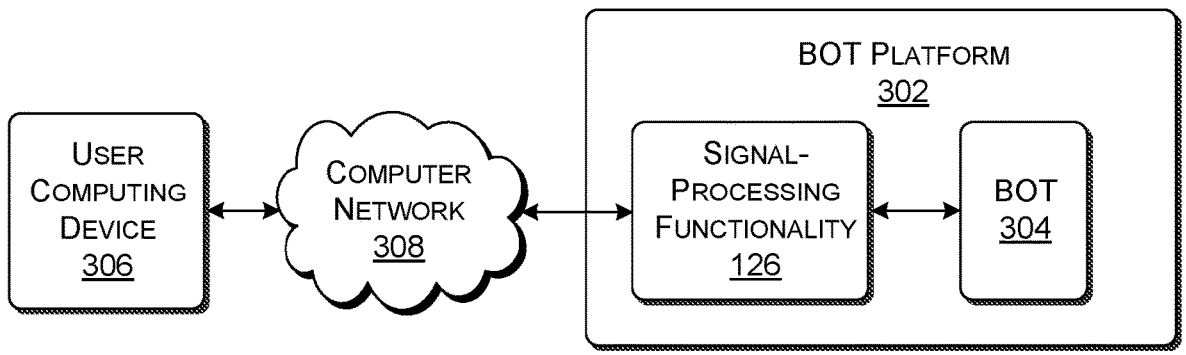
FIGS. 3-6 respectively show four different ways of implementing signal-processing functionality used in the computing system of FIG. 1.

Starting with FIG. 3, this figure shows a BOT platform 302 that hosts at least one BOT 304. A user interacts with the BOT 304 using a user computing device 306, via a computer network 308. In this implementation, the BOT platform 302 implements at least part of the signal processing functionality 126.

For example, the BOT platform 302 can implement the signal-providing component 110 by actually intercepting electronic messages and other event signals that pass between the user and the BOT 304, collectively referred to herein as transaction information. The signal-providing component 110 can use the captured transaction information to generate the implicit quality signals. Subsection A.2 (below) provides examples of these transaction-related events.

For example, the BOT platform 302 can implement the signal-providing component 110 as part of its connector component, as part of one or more the communication channels (such as communication applications), or as a separate mechanism. More specifically, assume that the BOT 304 is configured such that it can be accessed through a personal digital assistant. And further assume that the personal digital assistant is also implemented by the BOT platform. In this case, the personal digital assistant can implement the signal-providing component 110. For instance, the personal digital assistant has privileged access to the electronic messages passed between the user and the BOT 304, and therefore can readily intercept those messages.

Alternatively, or in addition, the BOT platform 302 of FIG. 3 can implement any of the signal-utilizing components 114. For instance, the shared resources 108 (of FIG. 1) can incorporate any of the search engine 120, the recommendation engine 122, and/or the abandonment-determination component 124.

Figure 4:
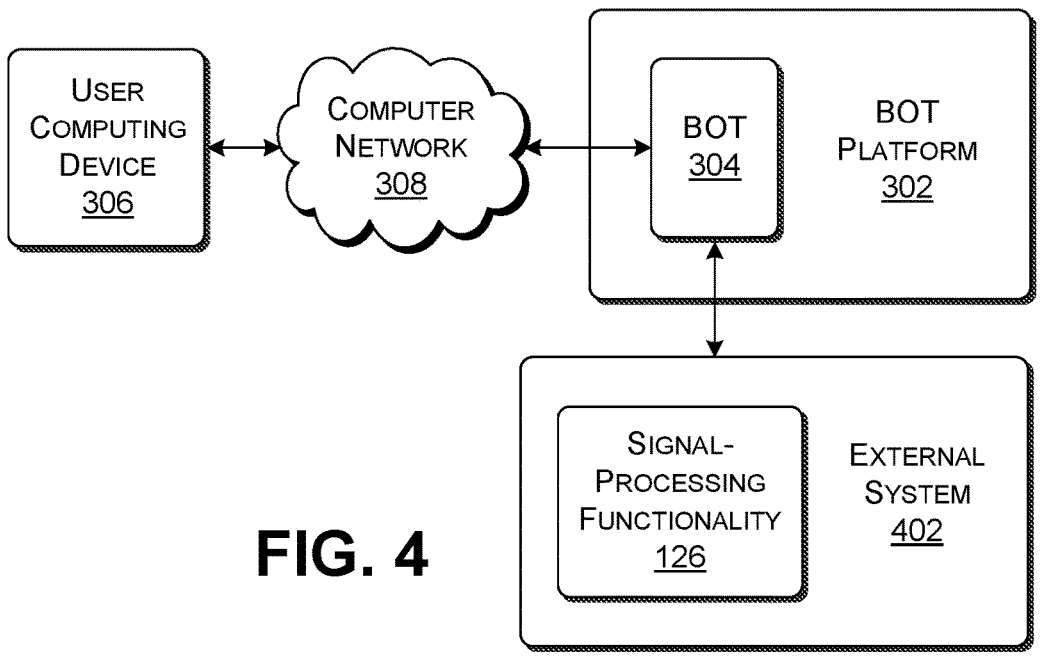

FIG. 4 shows a case in which at least one external computing system 402 implements at least part of the signal processing functionality 126. For instance, the external computing system 402 may implement the signal-providing component 110. To perform this role, the BOT 304 can be configured to forward transaction information pertaining to transaction-related events to the external computing system 402, where those transaction-related events occur over the course of communication between the user and the BOT 304. Or the external computing system 402 can poll the BOT 304 to provide this transaction information. Upon receipt, the signal-providing component 110 can use the transaction information to generate the implicit quality signals. Alternatively, or in addition, the external computing system 402 can also implement any part(s) of the signal-utilizing components 114.

Figure 5:
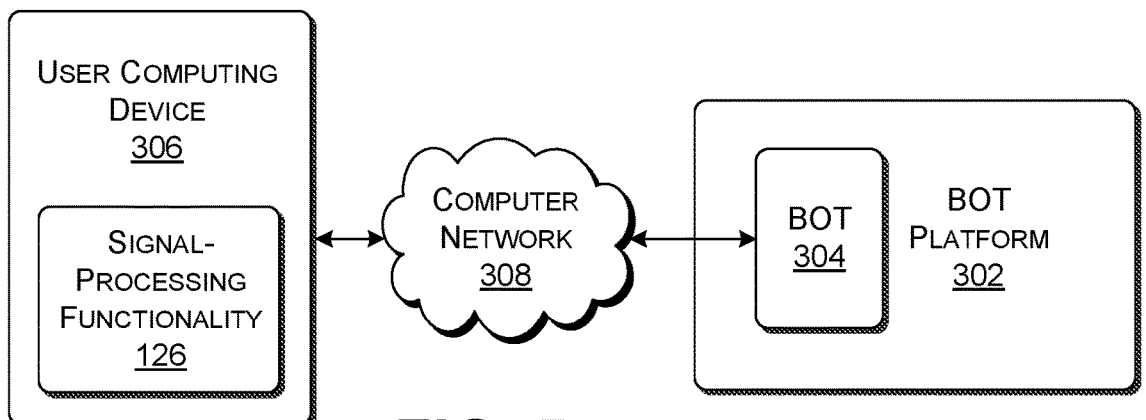

FIG. 5 shows the case in which each user computing device 306 implements at least part of the signal processing functionality 126. For example, the local user computing device 306 can implement the signal-providing component 110 by capturing transaction information that describes transaction-related events associated with communication between the user and the BOT 304. The signal-providing component 110 can then generate the implicit quality signals on the basis of the transaction information. More specifically, in one case, a browser program provided by the user computing device 306 (and with which the user interacts with the BOT 304) can implement the signal-providing component 110. Upon providing the implicit quality signals, the user computing device 306 may then forward the signals to a central signal data store 112 provided by the BOT platform 302, or by some other system. Alternatively, or in addition, the user computing device 306 can implement any part(s) of the signal-utilizing components 114, e.g., by providing a local abandonment-determination component 124, a local search engine 120, and/or a local recommendation engine 122.

Figure 6:
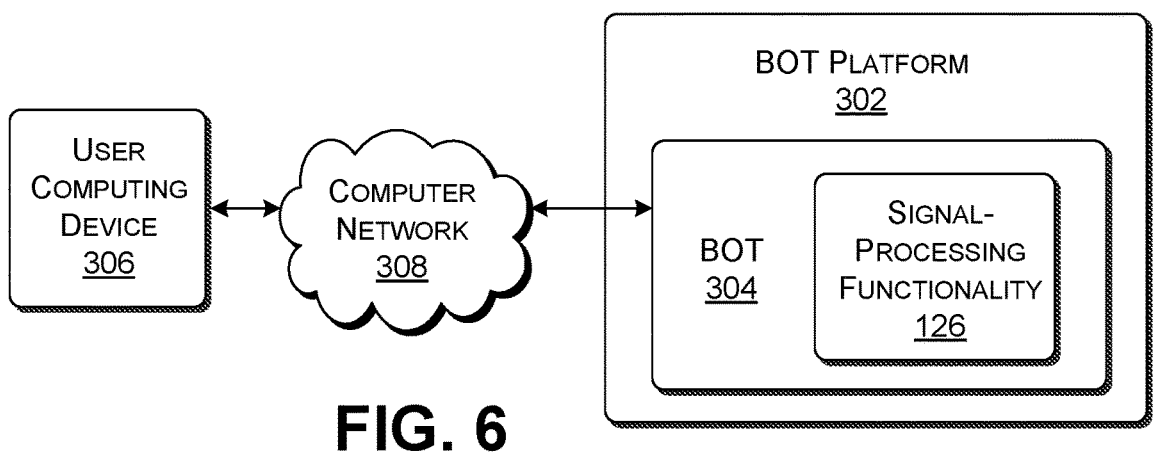

FIG. 6 shows a case in which the individual BOT 304 implements any part of the signal processing functionality 126. For example, the individual BOT 304 can implement the signal-providing component 110 by capturing transaction information that describes transaction-related events associated with the communication between the user and the BOT 304. The signal-providing component 110 can then generate the implicit quality signals on the basis of this transaction information. The BOT 304 may then forward the implicit quality signals to a central implicit signal data store 112 provided by the BOT platform 302, or some other system. Alternatively, or in addition, the BOT 304 can implement any part(s) of the signal-utilizing components, e.g., by providing a BOT-specific abandonment-determination component 124, a BOT-specific search engine 120, and/or a BOT-specific recommendation engine 122.

The implementations shown in FIGS. 3-6 are described by way of illustration, not limitation. Other environments can use any other mechanisms to implement any part(s) of the signal processing functionality 126. Further note that the implementations of FIGS. 3-6 are not mutually exclusive. That is, a single configuration can adopt different parts of the respective strategies shown in FIGS. 3-6.

A.2. Signal-Providing Component

Figure 7:
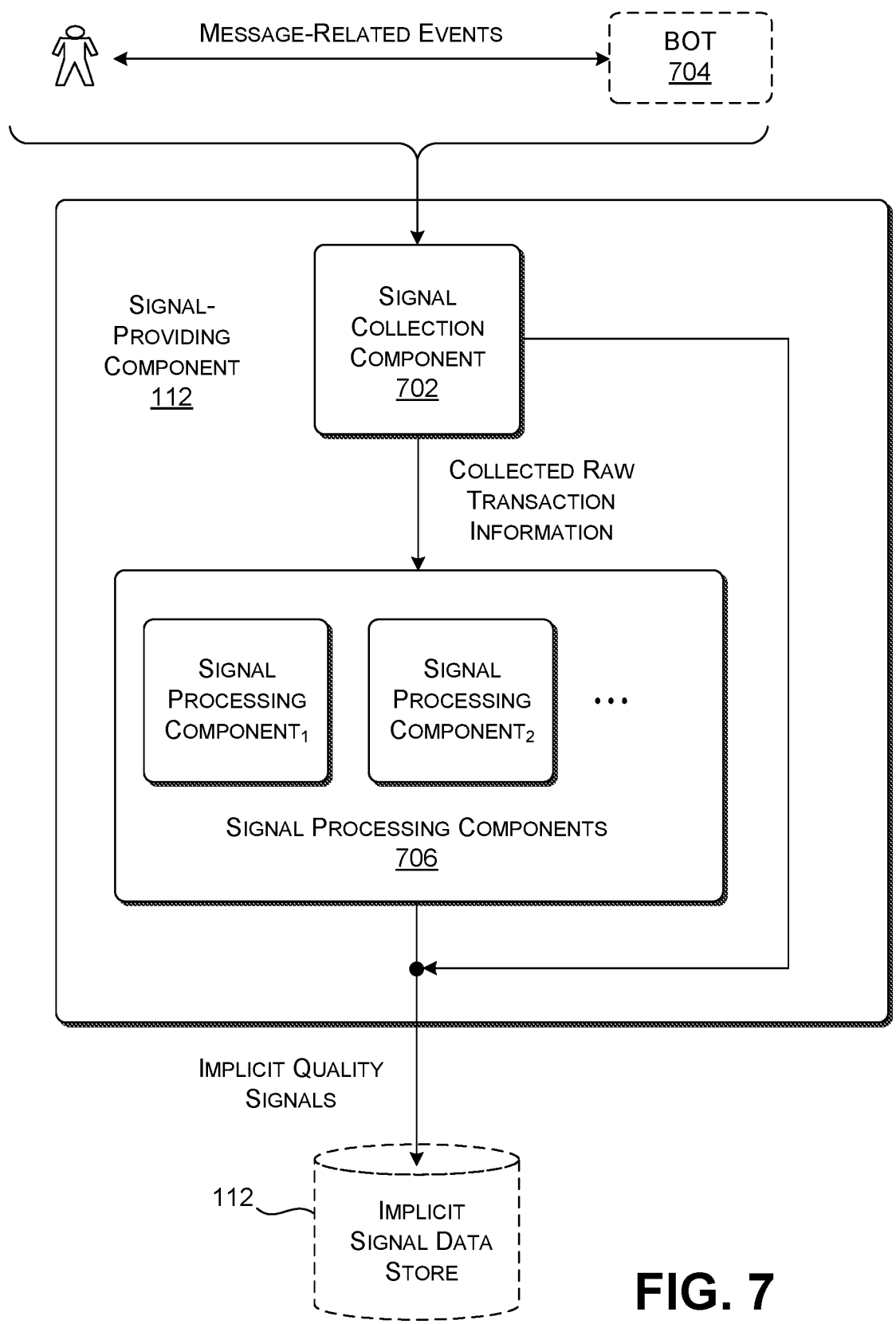
FIG. 7 shows one implementation of a signal-providing component, which is one component of the computing system of FIG. 1.

FIG. 7 shows one implementation of the signal-providing component 110. The signal-providing component 110 includes a signal collection component 702 for capturing transaction information that is representative of transaction-related events that occur over the course of communication between a user and a BOT 704. The transaction-related events can correspond to any of: (a) the content of electronic messages provided by the user to the BOT 704, and any metadata associated therewith (such as timing information); (b) the content of messages provided by the BOT 704 to the user, and any metadata associated therewith (such as timing information); (c) other actions taken by the user during the communication session, such as the activation of a help command, etc.; (d) other actions taken by the BOT 704 during the communication session, such as the delegation of a conversation to a human assistant, and so on.

The signal collection component 702 can be implemented in different ways, representing by FIGS. 3-6. For instance, in the configuration of FIG. 3, the signal collection component 702 can correspond to a mechanism within the BOT platform 302 which actually intercepts the electronic messages and other event signals flowing between the user and the BOT 704. In the case of the configuration of FIG. 4, the signal collection component 702 can correspond to a mechanism within the external computing system 402 that receives transaction information from the BOT 704. In that scenario, the signal collection component 702 can collect the transaction information using a push-based strategy, a pull-based strategy, and/or any other data collection strategy.

In some cases, the signal-providing component 110 can treat one or more aspects of the collected raw transaction information as implicit quality signals, without performing any further processing on those signals. In another case, the signal-providing component 110 can perform any downstream processing on the transaction information, to provide higher-level implicit quality signals. To this end, the signal-providing component 110 can include a plurality of signal processing components 706 that process the transaction information captured by the signal collection component 702, to generate a plurality of respective higher-level implicit quality signals. For example, in one case, a signal processing component can generate an implicit signal by performing mathematical operations on the transaction information, e.g., by subtracting one timestamp from another, etc. In another case, a signal processing component can provide an implicit quality signal using a machine-trained model or a rules-based engine, and so on.

More specifically, the following description provides an illustrative and non-limiting list of different implicit quality signals that the signal-providing component 110 can generate or otherwise provide. Generally, the implicit quality signals are categorized into user-behavior implicit quality signals that describe the behavior of the user, BOT-behavior implicit signals that describe the behavior of the BOT 704, and transaction-summary implicit signals which summarize one or more multi-turn transactions between the user and the BOT 704.

User-Behavior Implicit Signals. A first user-behavior implicit signal is a user sentiment signal that implicitly expresses a level of satisfaction by the given user with the BOT 704. In one implementation, a signal processing component generates the user sentiment signal by first forming one or more input vectors that describe the content of one or more messages sent by the user to the BOT 704. For example, the signal processing component can form a series of one-hot vectors associated with the words in one or more messages, where each dimension of such a vector represents the presence or absence of a particular word in a vocabulary. Or the signal processing component can form a series of letter-based n-gram vectors associated with the words in one or more messages, where each dimension of such a vector represents the presence or absence of a particular three-letter combination.

The signal processing component can then use a machine-trained model or rules-based engine to map the input vectors to an output score. For instance, without limitation, the signal processing component can use deep neural network (DNN) of any type to generate the output score. The output score represents a level of the user's satisfaction with the BOT 704, e.g., on a scale from −1 (for very unfavorable) to 0 (for very favorable). The signal processing component can generate a score for any scope of interaction, such as a single electronic message, an entire communication session, or multiple communication sessions. The signal processing component can optionally also take into consideration additional evidence of the user's satisfaction besides the content of the user's electronic messages.

A training system can generate a user sentiment model using a training dataset which reflects a correlation between textual content and rating information. For example, the training system can form a training dataset based on a database of movie reviews. Each such review contains a textual description of a movie, together with a rating. Each such review constitutes a training example, with the rating constituting a label assigned to the textual description.

A second user-behavior implicit signal is a user response time signal that describes an amount of time that the given user takes to respond to the given BOT 704. A signal processing component can compute this implicit quality signal by subtracting a timestamp associated with the receipt of an electronic message from the BOT 704 from a timestamp associated with a subsequent electronic message that the user sends to the BOT 704. The signal processing component can also generate any statistical measure of the user's response times over any span of time, such as a single session, multiple sessions, etc. (e.g., by computing an average time, a maximum time, a minimum time, etc.).

A third user-behavior implicit signal is a help activation signal that indicates whether the given user has activated a help service in the course of interacting with the given BOT. A signal processing component can generate this kind of implicit quality signal when it detects a telltale code or the like in the transaction information captured by the signal collection component 702, indicating that a user has activated a help command, e.g., by pressing a help control on a user interface presentation or by speaking a keyword that is indicative of the fact that the user is requesting help, etc.

A fourth user-behavior implicit signal is a message repetition signal that indicates a number of times that the given user has repeated a same electronic message in the course of performing a transaction with the given BOT. A signal processing component of the signal-providing component 110 can generate this signal by counting a number of times that a user forwards the same electronic message to the BOT 704, with respect to any measure of message similarity (e.g., exact match, edit distance, etc.).

BOT-Behavior Implicit Signals. A first BOT-behavior implicit signal is an intent completion signal that indicates whether the given BOT has successively met a transaction goal of the given user, referred to as the user's intent. A signal processing component can provide the intent completion signal by mapping input information into a score that represents the likelihood that the user's goal has been achieved. The input information can include the content of one or more electronic messages sent by the BOT 704 to the user. In addition, the input information can include any evidence as to whether a desired goal has been achieved. That evidence can include an explicit confirmation from the user that the goal has been achieved. That evidence can also include an indication that a transaction-completion event has occurred, such as the making of a reservation, and so on. In one implementation, the signal processing component can use any machine-trained model to generate the score, such as a DNN, a logistic regression model, a cluster-based model, a decision tree model, a support vector machine model, and so on. In another implementation, the signal processing component can use a rules-based engine to generate the intent completion signal based on one or more discrete environment-specific rules.

A training system can generate an intent completion model based on any training dataset which includes labeled dialogs. Each label assigned to a dialog indicates whether the user's transaction goal has been achieved as a result of the dialog. In one approach, this dataset can be generated in a manual manner, e.g., by asking human reviewers to manually labels the dialogs. Such a training dataset can also be automatically extracted from BOT-related logs for those cases in which the issue of transaction completion is unambiguous (e.g., in those cases in which the dialog terminates in a purchase, reservation, calendar-setting event, etc.).

A second BOT-behavior implicit signal is a BOT response time signal that describes an amount of time that the given BOT 704 takes to respond to the user. A signal processing component can compute this implicit quality signal by subtracting a timestamp associated with the receipt of an electronic message from the user from a timestamp associated with a subsequent electronic message that the BOT 704 sends to the user. The signal processing component can also generate any statistical measure of the BOT's response times over any span of time, such as a single session, multiple sessions, etc. (e.g., by computing an average time, a maximum time, a minimum time, etc.).

A third BOT-behavior implicit signal is a delegation signal that indicates whether the BOT 704 has contacted a human agent in the course of a transaction with the user for assistance in resolving an issue that arises within the transaction. A signal processing component can generate this kind of implicit quality signal when it detects that the BOT 704 has performed a characteristic action associated with contacting a human agent.

Transaction-Summary Implicit Signals. A first transaction-summary implicit signal is a number-of-turns signal that describes a number of turns in a transaction between the given user and the given BOT 704. A signal processing component can generate this signal by counting the turns over the course of the conversation. The signal processing component can also generate any statistical measure of this metric over any span of time, such as a single session, multiple sessions, etc. (e.g., by computing an average number of turns, a maximum number of turns, a minimum number of turns, etc.).

The above list of implicit quality signals is described in the spirit of illustration, and not limitation. Other environments can adopt the use of additional signals, and/or omit one or more of the signals described above.

In some cases, the relationship between an implicit quality signal and the quality of service provided by the BOT 704 is the same for all contexts. In other cases, this relationship may vary from context to context. For example, the number-of-turns signal can suggest an inefficient BOT in some contexts (which is a negative-value assessment), and a detailed-oriented BOT in other cases (which is a positive-value assessment).

The signal-providing component 110 can represent each implicit quality signal using any data structure. In one case, the signal-providing component 110 represents an implicit quality signal by providing: a) information that identifies the BOT to which it pertains; b) information that identifies the user to which it pertains; c) information which describes an intent that the user was attempting to accomplish (such as the intent of making a reservation); d) information that identifies the type of implicit quality signal to which it corresponds (e.g., the type of "User Response Time"); e) a value associated with the implicit quality signal (e.g., the value of the User Response Time signal; f) a timestamp that identifies when the implicit quality signal occurred, or when it was provided; and g) information that identifies one or more other contextual factors associated with the providing of the implicit quality signal.

A.3. Abandonment-Determination Component

Figure 8:
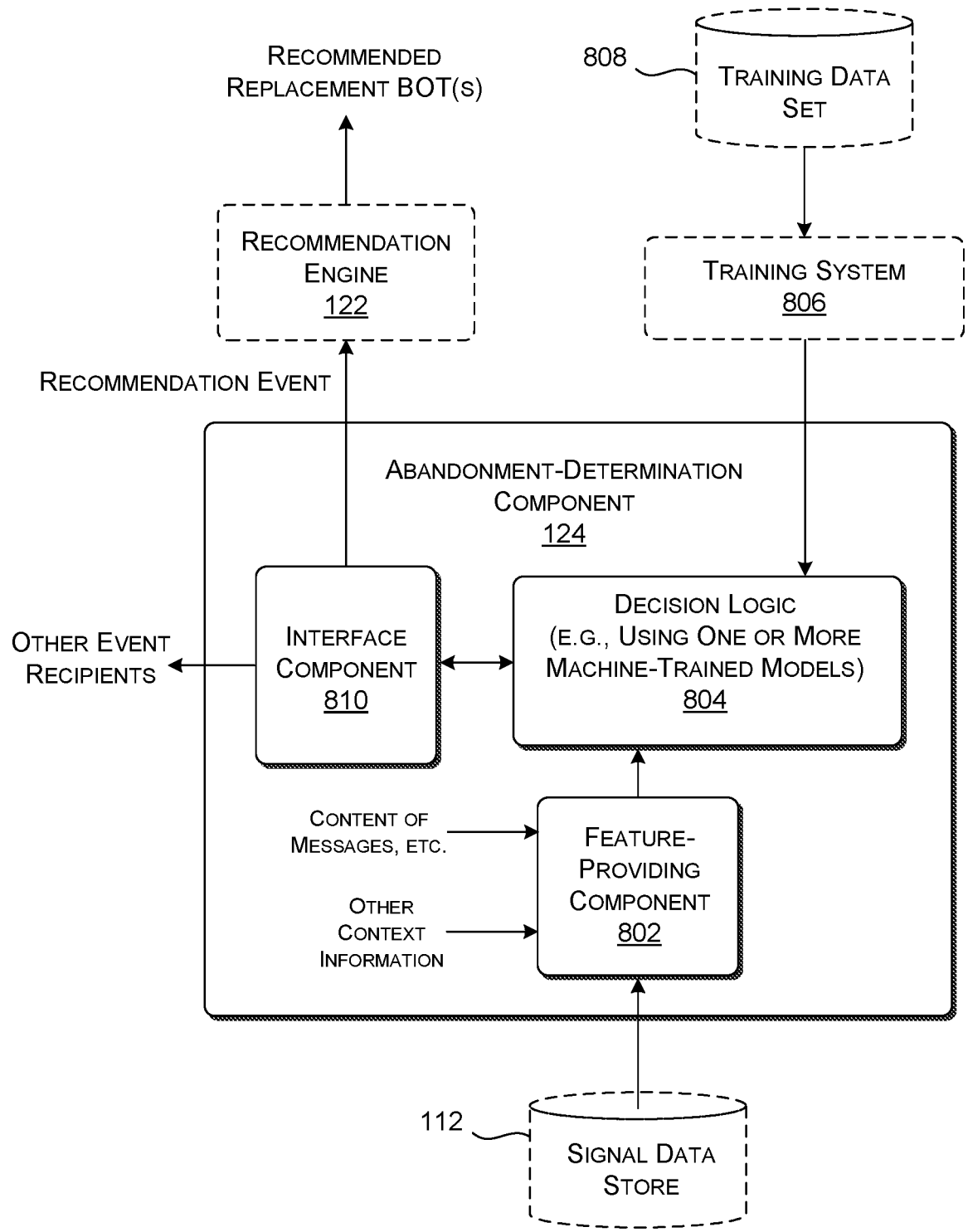
FIG. 8 shows one implementation of an abandonment-determination component, which is another component of the computing system of FIG. 1.

FIG. 8 shows one implementation of the abandonment-determination component 124. As described above in Subsection A.1, the abandonment-determination component 124 provides an output score that indicates the likelihood that a user has already abandoned a transaction with a current BOT, or is likely to abandon the transaction in the near future.

The abandonment-determination component 124 includes a feature-providing component 802 that provides a collection of features to decision logic 804. The feature-providing component 802 can provide some features by extracting current-transaction implicit quality signals from the signal data store 112. These current-transaction implicit quality signals correspond to implicit quality signals provided by the signal-providing component 110 in the course of a current transaction between the user and a current BOT. The previous subsection identified a collection of illustrative implicit quality signals. The feature-providing component 802 can also generate features associated with the content of the messages sent to the current BOT and/or from the current BOT. The feature-providing component 802 can also generate features based on other context information, such as the time of day, the identity of the user, etc.

The decision logic 804 maps the features collected by the feature-providing component 802 into a score. The decision logic 804 can perform this task using a machine-trained model (or models), and/or one or more rules-based engines, and/or any other analysis engine. For instance, without limitation, the decision logic 804 can use any of a DNN, a logistic regression model, a cluster-based model, a decision tree model, a support vector machine model, and so on.

A rules-based engine can apply a number of rules, such as IF-THEN-structured rules. One rule can indicate that the user has abandoned a transaction with a current BOT when the user has stopped responding to the current BOT for a prescribed amount of time, without yet achieving the user's presumed objective. Another rule can indicate that a user has abandoned a transaction when the user activates another BOT. Another rule can indicate that the user is likely to abandon a transaction when the user has repeated a same message more than a prescribed number k of times without the successful completion of the user's presumed objective. Another rule can indicate that the user is likely to abandon a transaction when the user makes an exclamation that is indicative of exasperation, such as "Oh, I give up!" etc.

A training system 806 can produce the machine-trained model (if used), based on a training dataset provided in a data store 808. The training dataset can include any data that describes transactions between users and BOTS, together with evidence of whether these transactions culminated in abandonment of the transactions. A crowdsourcing platform can produce the training dataset by manually applying labels to a set of dialogs. Or a BOT framework can automatically produce the training dataset for those occasions in which it is self-evident when the users have abandoned transactions.

An interface component 810 provides the output score generated by the decision logic 804 to one or more recipients of this information. One recipient is the recommendation engine 122. The recommendation engine 122 treats the score as a recommendation event, which prompts it to identify one or more other BOTs that the user may consider as replacements for the current BOT.

A.4. Search Engine

Figure 9:
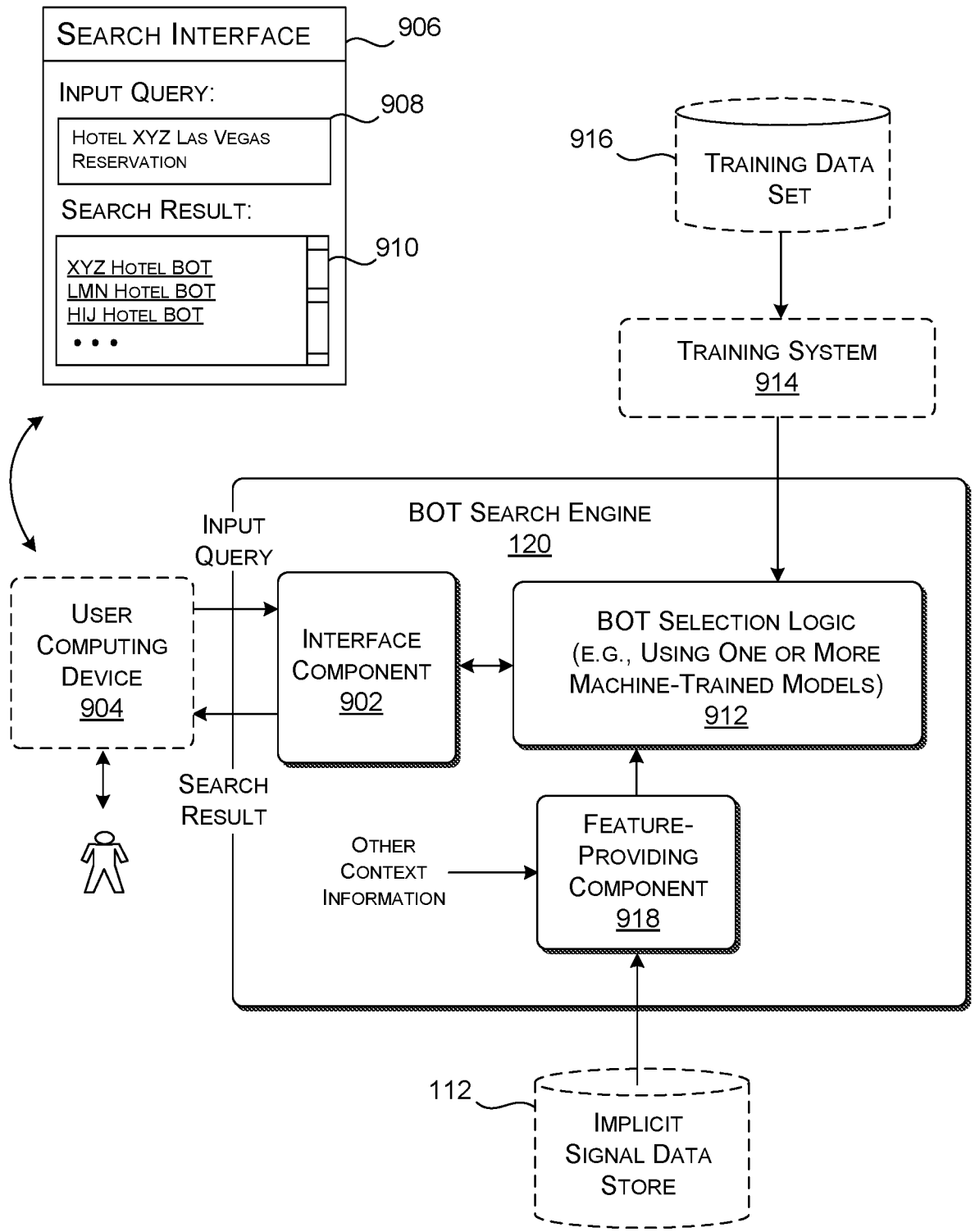
FIG. 9 shows one implementation of a search engine, which is another component of the computing system of FIG. 1.

FIG. 9 shows one implementation of the search engine 120 introduced in the context of FIG. 1. The search engine 120 includes an interface component 902 for interacting with a user via a user computing device 904. In one implementation, the interface component 902 provides a user interface presentation 906. The user interface presentation 906 includes a section 908 through which the user may enter an input query. The input query contains text that describes a BOT that the user wishes to find, e.g., by specifying one or more descriptive keywords. For instance, assume that the user wishes to interact with a BOT associated with a particular Las Vegas hotel (the generically-named "XYZ" hotel). In that case, the user may enter the illustrative input query: "Hotel XYZ Las Vegas Reservation." The user interface presentation 906 includes another section 910 that provides a search result which identifies one or more candidate BOTs that the search engine 120 has identified as a result of its search. The user may click on or otherwise activate one of the candidate BOTs to invoke it. Such an action constitutes an activation event in the terminology used herein. The user interface scenario shown in FIG. 9 is merely illustrative of a wide variety of user interface mechanisms that can be applied to interact with the user. For instance, alternatively, or in addition, the search engine 120 can interact with the user via a speech-enabled interface, and/or some other kind of interface.

The search engine 120 includes BOT selection logic 912 that maps the user's input query into the output result. The BOT selection logic 912 can perform this operation using any technique. Generally, the BOT selection logic 912 assigns a score to each candidate BOT in a collection of BOTs identified in the metadata data store 118. The score measures an extent to which the candidate BOT matches the input query. The BOT selection logic 912 generates the score based on a collection of features. Each feature describes some aspect of the context in which the search is performed. Without limitation, for instance, the features can encompass: characteristics regarding the input query (including the text of the input query, etc.); characteristics regarding the candidate BOT under consideration specified in the metadata data store 118 (including its name, classification, provider/creator, intent-related capabilities, rating, etc.); the circumstances in which the search is performed (such as the time and place in which the search is performed); characteristics of the user performing the search (such as the user's demographic profile, preferences, etc.), and so on. As described below, the features can also include some features that are based on the implicit quality signals stored the signal data store 112 for the candidate BOT under consideration.

In some implementations, the BOT selection logic 912 can apply a machine-trained model to generate the score. For example, the BOT selection logic 912 can use a model which computes the score as a weighted combination of different feature values. A training system 914 can compute the weights in an offline training procedure based on a training dataset provided in a data store 916, and/or a designer can hand-tune the weights.

In another example, the BOT selection logic 912 can use any type of DNN to compute the score. Such a model can map an input vector associated with the input query into a first vector ($v_1$) in a low-dimensional semantic space, and then map an input vector associated with the BOT under consideration (and all the features associated therewith) into a second vector ($v_2$) in the low-dimensional semantic space. The model can then compute the score based on the relation of these two vectors in the low-dimensional semantic space, e.g., using any metric of similarity, such as cosine similarity, etc. The training system 914 can compute the weights of the neural network in an offline training procedure.

In other cases, the BOT selection logic 912 can include two or more models that operate in any configuration, such as a series combination. For example the BOT selection logic 912 can include a first phase (L1) which determines the lexical similarity between the input query and textual information regarding each candidate BOT. The BOT selection logic 912 can use any algorithm to compute this metric, such as an edit distance metric (e.g., Levenshtein Distance metric), Jaccard index metric, etc. The first phase yields a set of top-ranked candidate BOTs. The BOT selection logic 912 includes a second phase (L2) which assigns a final score to each candidate BOT in the set, using an expanded group of features. The second phase L2 can use any of the models described above. Alternatively, or in addition, the BOT selection logic 912 can use a rules-based engine to generate a score for each candidate BOT under consideration.

As another possible aspect, the BOT selection logic 912 can use various techniques to increase the diversity of candidate BOTs in its output results. For example, by using a DNN, the BOT selection logic 912 can pick candidate BOTs that are not only close to the input query, but sufficiently different from each other. The DNN can achieve this result by ensuring that the semantic vectors associated with the candidate BOTs are mutually separated from each other by at least a prescribed distance (as measured using any distance metric, such as cosine similarity).

A feature-providing component 918 generates the features that are used by the BOT selection logic 912. For instance, the feature-providing component 918 can generate a usage-based feature for a candidate BOT based on a number of times that users have accessed that candidate BOT. The feature-providing component 918 can generate a ratings-based feature for the candidate BOT based on an average rating that users have given the candidate BOT. The feature-providing component 918 can generate a time-based feature which specifies the time at which the search is performed. The feature-providing component 918 can generate a location-based feature that describes the location at which the user is located, and so on.

The feature-providing component 918 can also generate at least one type of feature based on the implicit quality signals in the signal data store 112. For example, with respect to a particular candidate BOT X under consideration, the feature-providing component 918 can generate one or more features that describe whether users on average have been satisfied with the BOT X. More specifically, in one implementation, the feature-providing component 918 can provide individual features that directly correspond to the different individual implicit quality signals described above. Alternatively, or in addition, the feature-providing component 918 can map two or more raw implicit quality signals into a single higher-order signal that expresses a level of the user's satisfaction. Indeed, the feature-providing component 918 can use a separate machine-trained model (such as a neural network, a logistic regression model, etc.) to map all of the implicit quality signals into a single user satisfaction score. That score constitutes a single feature for input into the BOT selection logic 912.

The search engine 120 can operate in either a user-agnostic mode or a user-aware mode. For example, the feature-providing component 918 can generate a first class of features for each candidate BOT that describe the behavior of all users who have submitted searches within some prior identified period of time. Alternatively, or in addition, the feature-providing component 918 can generate a second class of features for each candidate BOT that reflects the specific prior behavior of the user who has submitted the input query in the present circumstance. For example, the feature-providing component 918 can generate one kind of feature that characterizes all users' level of satisfaction with a candidate BOT X under consideration. The feature-providing component 918 can generate a second kind of feature that characterizes the level of satisfaction of the user who has submitted the input query, with respect to the BOT X under consideration.

Further, the feature-providing component 918 can take account of the time at which actions took place in its calculation of the features. For example, consider the case in which the feature-providing component 918 is determining a feature based on the level of satisfaction of users with a candidate BOT X. The feature-providing component 918 can selectively weight the evidence that goes into this determination based on how temporally fresh that evidence is, relatively to a current time.

A.5. Recommendation Engine

Figure 10:
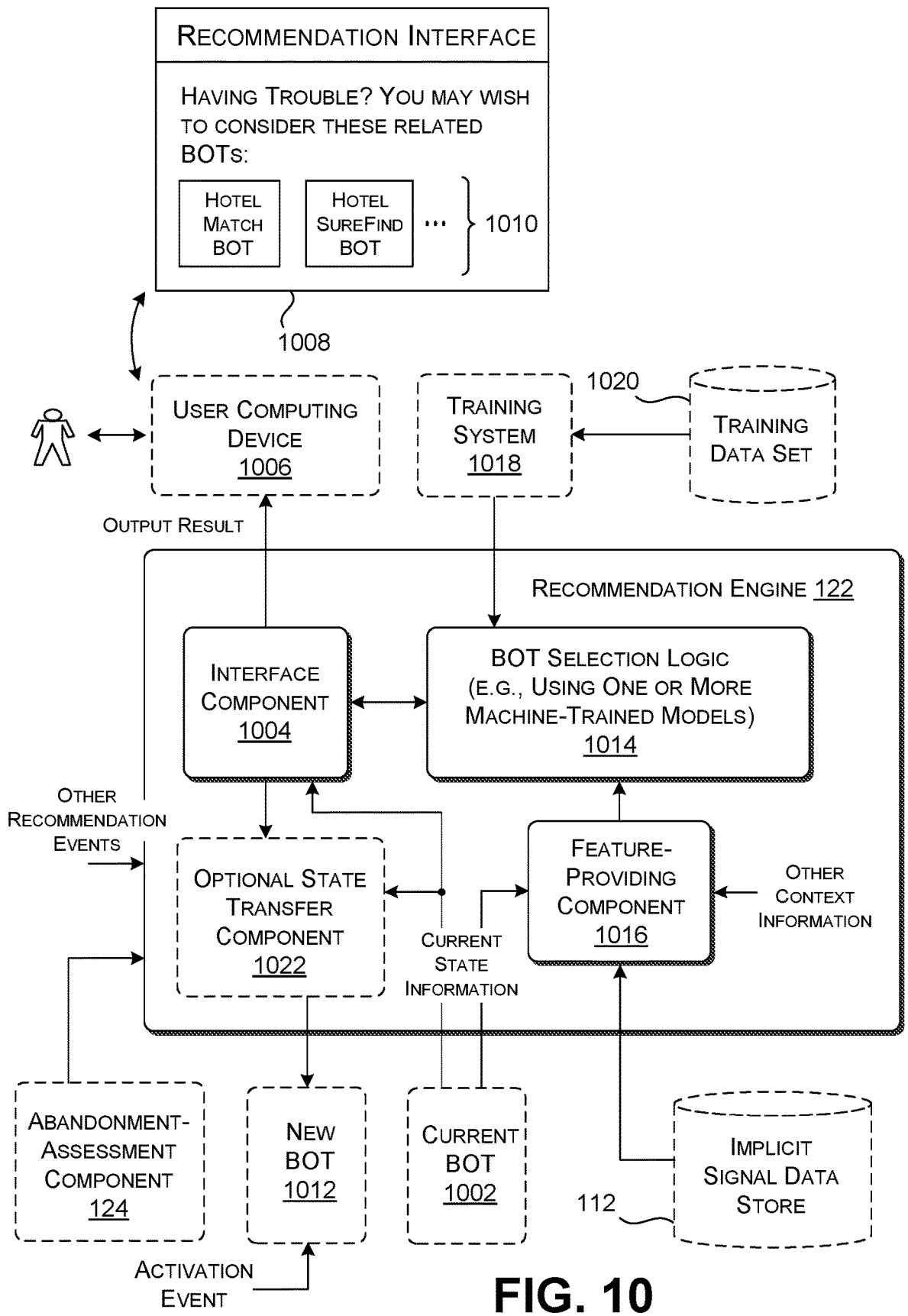
FIG. 10 shows one implementation of a recommendation engine, which is another component of the computing system of FIG. 1.

FIG. 10 shows one implementation of the recommendation engine 122. As described in Subsection A.1, the recommendation engine 122 recommends one or more candidate BOTs, with respect to a context defined by one or more reference BOTs. That is, the recommendation engine 122 recommends one or more BOTs that are considered suitable replacements or complements to the reference BOT(s). In some scenarios, a reference BOT may correspond to a current BOT 1002 with which the user is currently interacting, perhaps in a heretofore unsuccessful manner. In other scenarios, a reference BOT may correspond to a BOT that the user is currently viewing. For example, the user may visit a page of an online directory that describes the reference BOT, without yet invoking the reference BOT. In other scenarios, the reference BOT(s) may correspond to one more BOTs that the user has used in the past. To facilitate explanation, the recommendation engine 122 will be described below with respect to the first case described above, in which the reference BOT corresponds to the current BOT 1002 with which the user is currently interacting.

The recommendation engine 122 may invoke its recommendation services in response to different kinds of recommendation events. One recommendation event corresponds to the receipt of an output result provided by the abandonment-assessment component 124. That output result indicates that the user has terminated his or her interaction with the current BOT 1002, or is likely to soon terminate his or her interaction with this BOT 1002. Another recommendation event corresponds to an indication that the user has visited a prescribed page, such as a page associated with a reference BOT, a home page, or any other page in which recommendations are served, etc. Another recommendation event corresponds to an explicit request by the user. For example, the user may explicitly specify one or more reference BOTs, and then request the recommendation engine 122 to generate one or more other BOTs that are considered suitable replacements and/or complements to the reference BOT(s), and so on.

The recommendation engine 122 includes an interface component 1004 for receiving one or more input signals that identify the reference BOT(s). For example, the interface component 1004 can receive the input signal from the current BOT 1002 itself. The interface component 1004 also sends a recommendation result to one or more target entities. The recommendation result identifies one or more recommended candidate BOTs. For example, the interface component 1004 can send the recommendation result to a user via a user computing device 1006. For instance, in the example of FIG. 10, the interface component 1004 can present the recommended result in a user interface presentation 1008. The user interface presentation 1008 may display the recommended candidate BOTs in any manner, such as by displaying a set of icons 1010 associated with the recommended candidate BOTs. In other cases, the interface component 1004 in cooperation with the user computing device 1006 can present the recommended candidate BOTs in spoken form. Assume that one of the recommended BOTs corresponds to a new BOT 1012. The user may invoke that new BOT 1012 by clicking on its associated icon in the user interface presentation 1008.

BOT selection logic 1014 generates the recommendation result that identifies the recommended BOT(s). More specifically, the BOT selection logic 1014 can generate a score for each candidate BOT based on features generated by a feature-providing component 1016. The BOT selection logic 1014 can use any model to perform task. For example, the BOT selection logic 1014 can use a DNN to map a vector representation of a reference BOT (and all of the features associated therewith) to a first vector ($v_1$) in low-dimensioned semantic space. The DNN can map a vector representation of a candidate BOT (and all of the features associated therewith) to a second vector ($v_2$) in the low-dimensioned semantic space. The DNN can then generate a score which reflects the distance between the first vector to the second vector, e.g., using a cosine similarity metric. That score reflects an extent to which the candidate BOT is a suitable complement to the reference BOT. A training system 1018 can generate the weight values of the DNN based on a training dataset provided in a data store 1020.

Note that the BOT selection logic 1014 can use other machine-trained models to generate a score for each candidate BOT (e.g., besides a DNN), such as a weighted sum of feature values, a collaborative filter model, and so on. Further, the BOT selection logic 1014 can improve the diversity of the recommended candidate BOTs using the technique described in the previous subsection. Alternatively, or in addition, the BOT selection logic 1014 can use a rules-based engine to generate a score for each candidate BOT under consideration.

The feature-providing component 1016 can generate the same kinds of general features described above with reference to the search engine 120 (such as usage-based features, ranking-based features, location-based features, time-based features, user-based features, etc.). In addition, the feature-providing component 1016 can generate one or more features for each candidate BOT that are derived from implicit quality signals in the signal data store 112. For example, the feature-providing component 1016 can generate separate features for the individual implicit quality signals in the signal data store 112 for the candidate BOT under consideration. Alternatively, or in addition, the feature-providing component 1016 can use any type of model or rules-based engine to generate one or more higher-level implicit quality signals based on the raw implicit quality signals provided in the signal data store 112.

As in the case of the search engine 120, the BOT selection logic 1014 of the recommendation engine 122 can generate features in a user-agnostic manner and/or a user-aware manner. The BOT selection logic 1014 can also discount the contribution of implicit quality signals based on their temporal currency, that is, by decreasing the relevance of an event in proportion to its age.

An optional state transfer component 1022 facilitates the activation of the new BOT 1012 by transferring state information from the current BOT 1002 to the new BOT 1012. The state information may describe the objective of the transaction, the turns of the dialog that have been completed, and the turns of the dialog that have yet to be completed. The state information may also describe all of the information that the user has provided to the current BOT 1002 up to the point in which the user terminated his or her interaction with the current BOT 1002. This provision is helpful to the user, as it eliminates the need for the user to resupply that information to the new BOT 1012. In other words, the user is not forced to start from "scratch" when transitioning to the new BOT 1012.

A.6. Illustrative BOT

Figure 11:
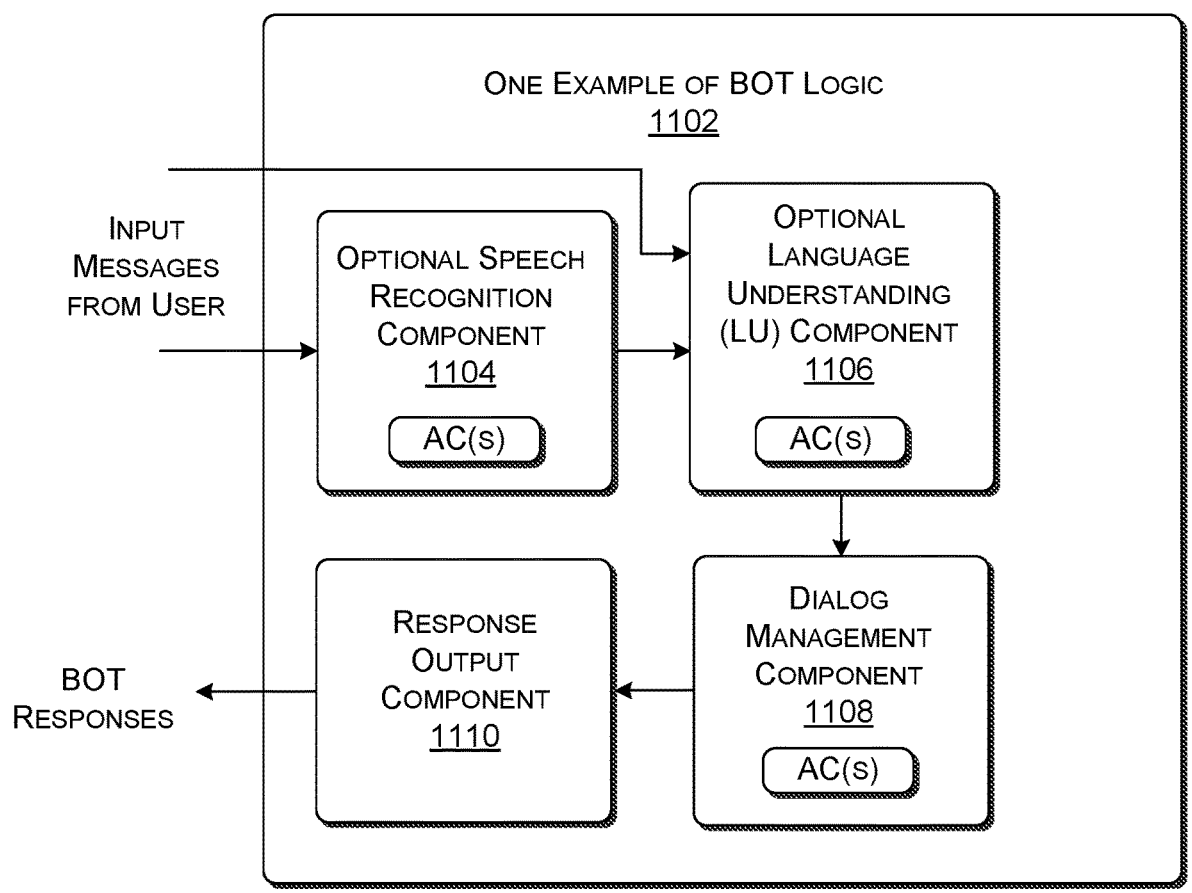
FIG. 11 show an illustrative BOT for use within the computing system of FIG. 1.

FIG. 11 shows illustrative BOT logic 1102 for use in any BOT. At the outset, however, it is pointed out that the computing system 102 is specifically designed to interact with a wide variety of BOTs of different types having different respective BOT logics; the particular BOT logic 1102 shown in FIG. 11 is therefore presented here in the spirit of illustration, not limitation.

In one implementation, the BOT logic 1102 includes four principal parts. As a first part, an optional speech recognition component 1104 receives an input signal from one or more audio input devices (not shown). In some cases, for instance, that input signal expresses a user's utterance as an audio waveform signal, captured by one or more microphones. The speech recognition component 1104 converts the input signal into recognized speech information. The speech recognition component 1104 can use any analysis component(s) (labeled in FIG. 11 as AC(s)) to perform this task, such as a deep neural network of any type.

In an alternative case, the BOT logic 1102 receives the user's messages in text form, which, for instance, the user may type into an input interface, such as the user interface presentation 210 of FIG. 2. In this case, the BOT logic 1102 omits the use of the speech recognition component 1104 in its processing of the input electronic messages.

In a second part, a language understanding (LU) component 1106 optionally uses one or more analysis components (AC(s)) to interpret the user's input message. In response to this analysis, the LU component 1106 outputs an interpreted user message. In one implementation, the LU component 1106 includes at least one domain determination component, at least one intent determination component, and at least one slot value determination component.

More specifically, the optional domain determination component determines the most probable domain associated with the input message. A domain pertains to the general theme to which an input message pertains, which may correspond to a set of tasks handled by a particular application, or a subset of those tasks. For example, the command "find Mission Impossible" pertains to a media search domain.

The intent determination component determines an intent associated with the input message. An intent corresponds to an objective that a user likely wishes to accomplish by submitting an input message. For example, a user who submits the command "find Mission Impossible" intends to find a particular movie having the name of "Mission Impossible." A user who submits the command "buy Mission Impossible" intends to purchase the movie "Mission Impossible," and so on.

The slot value determination component determines slot values in the input message. The slot values correspond to information items that an application needs to perform a requested task, upon interpretation of the input message. For example, the command, "find Jack Nicolson movies in the comedy genre" includes a slot value "Jack Nicolson" that identifies an actor having the name of "Jack Nicolson," and a slot value "comedy," corresponding to a requested genre of movies.

Any of the domain determination component, intent determination component, and slot value determination component can use any technology to perform their respective functions. For example, any of these components can use one or more machine-trained models. To cite merely one illustrative and non-limiting case, the domain determination component may correspond to a machine-trained model, such as a logistic regression model, a DNN model, a clustering-based model, a decision tree model, a support vector machine model, and so on. The intent determination component can likewise correspond to any of these kinds of models. The slot value determination component may correspond to a machine-trained Conditional Random Fields (CRF) model. A CRF model assigns the most likely tags to parts of a message, selected from a set of possible tags. The tags correspond to slot variables, such as, in the media search domain, the tags, "actor name," "release date," "genre," etc. In the above example, the CRF model would determine that the term "Jack Nicolson" corresponds to an actor name, having the particular value "Jack Nicolson."

Alternatively, or in addition, any of the domain determination component, the intent determination component, and/or the slot value determination component can use a rules-based engine to perform its respective analysis. For example, any of these components can apply rules which maps certain keywords in an input message into appropriate classification results. For instance, the intent determination component can apply a rule that indicates that any input message that matches the template "buy <x>" refers to an intent to buy a particular product, where that product is identified by the value of variable x.

In a third part of the BOT logic 1102, a dialog management component 1208 uses one or more analysis components (AC(s)) to track the state of the ongoing conversation and to map the interpreted input message into a BOT response. In one implementation, the dialog management component 1108 can use a machine-trained model (such as a recurrent neural network (RNN)) to perform its mapping operation. Alternatively, or in addition, the dialog management component 1108 can use a rules-based engine to perform its mapping operation. Alternatively, or in addition, the dialog management component 1108 can generate a BOT response based on one or more dialog script templates provided in a data store.

In a fourth part, a response output component 1110 converts the BOT response generated by the dialog management component 1108 into an appropriate output form, and then sends the converted BOT response to user. For example, the response output component 1110 can use a text-to-speech synthesizer to convert a text-based representation of the BOT response into audio form.

In other implementations, a BOT can rely on the shared resources 108 in the computing platform (which hosts the collection of BOTs 104) to perform one or more of the operations described above, that is, without providing stand-alone functionality to handle these tasks.

B. Illustrative Processes

FIGS. 12-16 together show processes that explains the operation of the computing system 102 of Section A in flowchart form. Since the principles underlying the operation of the computing system 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 12 shows an overview of a signal collection process 1202 performed by the signal-providing component 110 of FIG. 7. In block 1204, the signal-providing component 110 provides implicit quality signals over a span of time that reflect quality of service provided by a collection of BOTs to a group of users. The signal-providing operation involves capturing transaction information related to transaction-related events that occur over the course communication between the group of users and the BOTs. In block 1206, the signal-providing component 110 stores the implicit quality signals in a signal data store 112.

FIG. 13 shows an overview of an abandonment-assessment process 1302 performed by the abandonment-determination component 124 of FIG. 8. In block 1304, the abandonment-determination component 124 receives one or more current-transaction implicit quality signals produced in the course of interaction between a current user and a current BOT, wherein each current-transaction implicit quality signal reflects a quality of service provided by the current BOT to the current user. In block 1306, the abandonment-determination component 124 maps the current-transaction implicit quality signal(s) to an output result, the output result constituting a BOT-recommendation event.

FIG. 14 shows a training process 1402 performed by the computing system 102 of FIG. 1, used to generate one or more machine-trained models based, in part, on the provided implicit quality signals. In block 1404, the computing system 102 trains a machine-trained model based on the implicit quality signals. The computing system 102 can perform this task using known training techniques, such as gradient descent. In block 1406, the computing system 102 transfers the machine-trained model to a signal-utilizing component for use by the signal-utilizing component.

FIG. 15 shows an overview of a search process 1502 performed by the search engine 120 of FIG. 9. In block 1504, the search engine 120 receives an input query from the current user. In block 1506, the search engine 120 identifies at least one selected BOT in the collection of BOTs by matching the input query against information pertaining to a group of available BOTs, to provide a search result. The identifying operation is based, in part, on the implicit quality signals provided in a signal data store 112. In block 1508, the search engine 120 sends an electronic message to a user computing device associated with the current user, the electronic message conveying the search result. In block 1510, the computing system invokes a selected BOT in response to a BOT activation event.

FIG. 16 shows an overview of a recommendation process 1602 performed by the recommendation engine 122 of FIG. 10. In block 1604, the recommendation engine 122 detects a BOT-recommendation event in the course of an interaction between a current user and a current BOT, or in the course of the current user performing any other transaction. The current BOT corresponds to a computer-implemented agent that provides a service to the current user. In block 1606, in response to the BOT-recommendation event, the recommendation engine 122 identifies at least one recommended BOT in a collection of BOTs, to provide a recommendation result. The identifying operation is based, in part, on implicit quality signals provided in a signal data store 112. In block 1608, the recommendation engine 122 sends an electronic message to a user computing device associated with the current user, the electronic message conveying the recommendation result provided by the recommendation engine 122. In block 1610, the computing system 102 invokes a selected BOT in response to a BOT activation event.

C. Representative Computing Functionality

Figure 17:
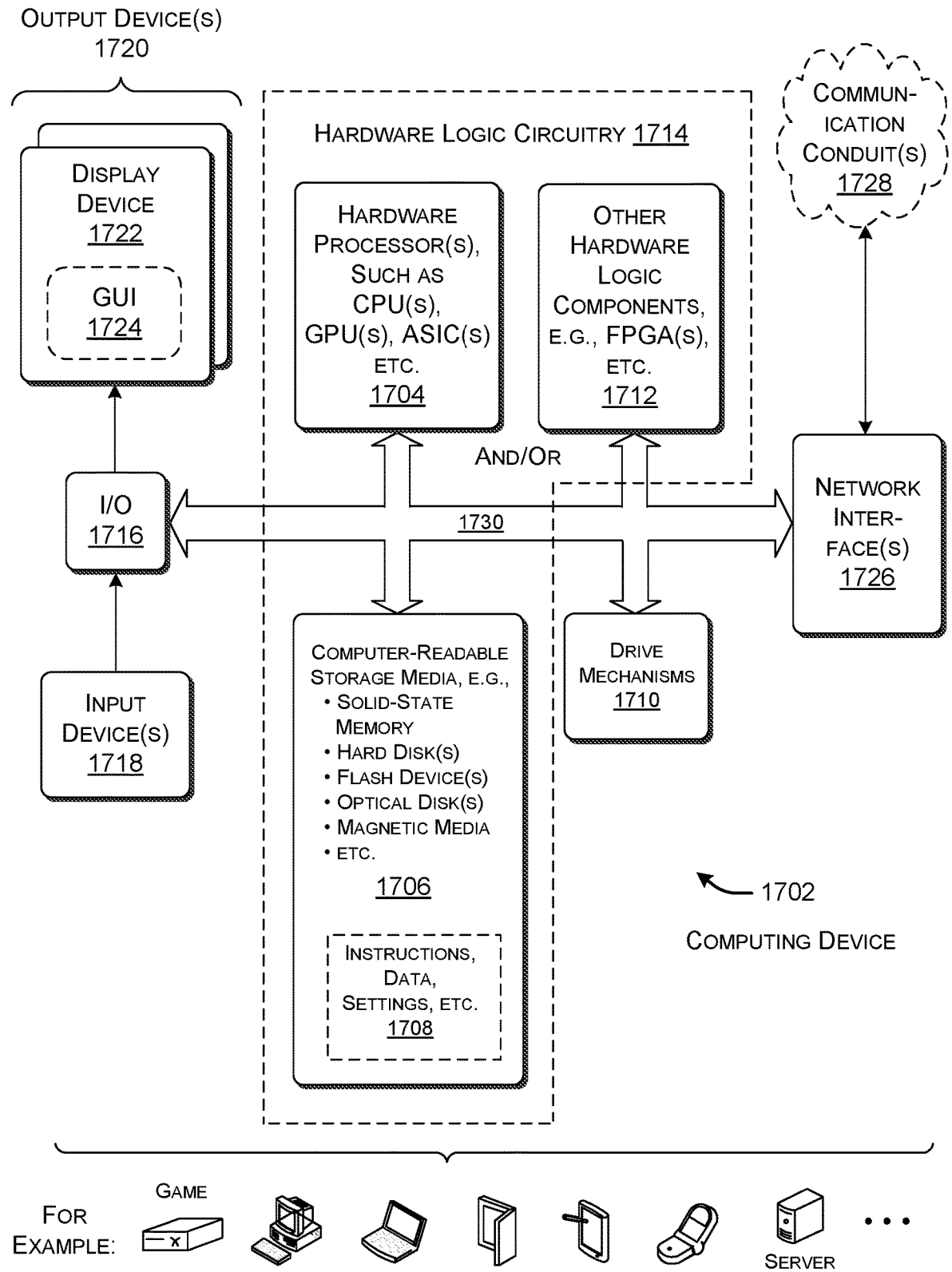
FIG. 17 shows an illustrative type of computing device that can be used to implement any aspect of the features shown in the foregoing drawings.

FIG. 17 shows a computing device 1702 that can be used to implement any aspect of the mechanisms set forth in the above-described figures. For instance, with reference to FIG. 2, the type of computing device 1702 shown in FIG. 17 can be used to implement any server associated with the signal processing functionality 126 and/or the collection of BOTs 104, and any user computing device, etc. In all cases, the computing device 1702 represents a physical and tangible processing mechanism.

The computing device 1702 can include one or more hardware processors 1704. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1702 can also include computer-readable storage media 1706, corresponding to one or more computer-readable media hardware units. The computer-readable storage media 1706 retains any kind of information 1708, such as machine-readable instructions, settings, data, etc. Without limitation, for instance, the computer-readable storage media 1706 may include one or more solid-state devices, one or more magnetic hard disks, one or more optical disks, magnetic tape, and so on. Any instance of the computer-readable storage media 1706 can use any technology for storing and retrieving information. Further, any instance of the computer-readable storage media 1706 may represent a fixed or removable component of the computing device 1702. Further, any instance of the computer-readable storage media 1706 may provide volatile or non-volatile retention of information.

The computing device 1702 can utilize any instance of the computer-readable storage media 1706 in different ways. For example, any instance of the computer-readable storage media 1706 may represent a hardware memory unit (such as Random Access Memory (RAM)) for storing transient information during execution of a program by the computing device 1702, and/or a hardware storage unit (such as a hard disk) for retaining/archiving information on a more permanent basis. In the latter case, the computing device 1702 also includes one or more drive mechanisms 1710 (such as a hard drive mechanism) for storing and retrieving information from an instance of the computer-readable storage media 1706.

The computing device 1702 may perform any of the functions described above when the hardware processor(s) 1704 carry out computer-readable instructions stored in any instance of the computer-readable storage media 1706. For instance, the computing device 1702 may carry out computer-readable instructions to perform each block of the processes described in Section B.

Alternatively, or in addition, the computing device 1702 may rely on one or more other hardware logic components 1712 to perform operations using a task-specific collection of logic gates. For instance, the hardware logic component(s) 1712 may include a fixed configuration of hardware logic gates, e.g., that are created and set at the time of manufacture, and thereafter unalterable. Alternatively, or in addition, the other hardware logic component(s) 1712 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 17 generally indicates that hardware logic circuitry 1714 corresponds to any combination of the hardware processor(s) 1704, the computer-readable storage media 1706, and/or the other hardware logic component(s) 1712. That is, the computing device 1702 can employ any combination of the hardware processor(s) 1704 that execute machine-readable instructions provided in the computer-readable storage media 1706, and/or one or more other hardware logic component(s) 1712 that perform operations using a fixed and/or programmable collection of hardware logic gates.

In some cases (e.g., in the case in which the computing device 1702 represents a user computing device), the computing device 1702 also includes an input/output interface 1716 for receiving various inputs (via input devices 1718), and for providing various outputs (via output devices 1720). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1722 and an associated graphical user interface presentation (GUI) 1724. The display device 1722 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1702 can also include one or more network interfaces 1726 for exchanging data with other devices via one or more communication conduits 1728. One or more communication buses 1730 communicatively couple the above-described components together.

The communication conduit(s) 1728 can be implemented in any manner, e.g., by a local area computer network, a wide area computer network (e.g., the Internet), point-to-point connections, etc., or any combination thereof. The communication conduit(s) 1728 can include any combination of hardwired links, wireless links, routers, gateway functionality, name servers, etc., governed by any protocol or combination of protocols.

FIG. 17 shows the computing device 1702 as being composed of a discrete collection of separate units. In some cases, the collection of units may correspond to discrete hardware units provided in a computing device chassis having any form factor. FIG. 17 shows illustrative form factors in its bottom portion. In other cases, the computing device 1702 can include a hardware logic component that integrates the functions of two or more of the units shown in FIG. 1. For instance, the computing device 1702 can include a system-on-a-chip (SoC or SOC), corresponding to an integrated circuit that combines the functions of two or more of the units shown in FIG. 17.

The following summary provides a non-exhaustive set of illustrative aspects of the technology set forth herein.

According to a first aspect, one or more computing devices are described for assisting users in interacting with BOTs. The computing device(s) include hardware logic circuitry, the hardware logic circuitry corresponding to: (a) one or more hardware processors that perform operations by executing machine-readable instructions stored in a memory, and/or by (b) one or more other hardware logic components that perform operations using a task-specific collection of logic gates. The operations include: detecting a BOT-recommendation event in a course of a transaction performed by a current user; and, in response to the BOT-recommendation event, identifying, using a recommendation engine, at least one recommended BOT in a collection of BOTs, to provide a recommendation result. The identifying operation is based, in part, on implicit quality signals provided in a signal data store. The operations also include sending an electronic message to a user computing device associated with the current user, the electronic message conveying the recommendation result provided by the recommendation engine. The implicit quality signals in the signal data store are provided in a signal-providing process, performed by the hardware logic circuitry, which involves: providing the implicit quality signals over a span of time that reflect quality of service provided by the collection of BOTs to a group of users; and storing the implicit quality signals in the signal data store. The BOTs correspond to computer-implemented agents that provide respective services to the group of users. The providing operation involves capturing transaction information related to transaction-related events that occur over a course of communication between the group of users and the BOTs. The implicit quality signals include at least: one of more user-behavior implicit signals, each of which describes one or more actions taken by a given user in interacting with a given BOT, and each of which has an implicit bearing on quality of service provided by the given BOT; and one of more BOT-behavior implicit signals, each of which describes one or more actions taken by the given BOT in interacting with the given user, and each of which has an implicit bearing on quality of service provided by the given BOT.

According to a second aspect, one user-behavior implicit signal is a user sentiment signal that implicitly expresses a level of satisfaction by the given user with the given BOT, based at least on content of one or more electronic messages provided by the given user to the given BOT.

According to a third aspect, dependent on the second aspect, the hardware logic circuitry includes a signal processing component that is configured to: receive one or more electronic messages sent by the given user to the given BOT; and use a machine-trained model to map the electronic message(s) to an output result that constitutes the user sentiment signal.

According to a fourth aspect, one user-behavior implicit signal is a user response time signal that describes an amount of time that the given user takes to respond to the given BOT, with respect to one or more opportunities for response.

According to a fifth aspect, one user-behavior implicit signal is a help activation signal that indicates whether the given user has activated a help service in a course of interacting with the given BOT.

According to a sixth aspect, one user-behavior implicit signal is a message repetition signal that indicates a number of times that the given user has repeated a same electronic message in a course of performing a transaction with the given BOT.

According to a seventh aspect, one BOT-behavior implicit signal is an intent completion signal that indicates whether the given BOT has successfully met a transaction goal of the given user.

According to an eighth aspect, dependent on the seventh aspect, the hardware logic circuitry includes a signal processing component that is configured to: receive evidence that the given BOT has successfully met the transaction goal; and use a machine-trained model to map the evidence to an output result that constitutes the intent completion signal.

According to a ninth aspect, one BOT-behavior implicit signal is a BOT response time signal that describes an amount of time that the given BOT takes to respond to the given user, with respect to one or more opportunities for response.

According to a tenth aspect, one BOT-behavior implicit signal is a delegation signal that indicates whether the given BOT has contacted a human in a course of a transaction with the given user for assistance in resolving an issue that arises within the transaction.

According to an eleventh aspect, the implicit quality signals further include one of more transaction-summary implicit signals, each of which describes a characteristic of at least one complete multi-turn transaction between the given user and the given BOT.

According to a twelfth aspect, dependent on the eleventh aspect, one transaction-summary implicit signal is a number-of-turns signal that describes a number of turns in at least one transaction between the given user and the given BOT.

According to a thirteenth aspect, the transaction performed by the current user corresponds to an interaction between the current user and a current BOT, wherein the current BOT corresponds to a computer-implemented agent that provides a service to the current user. Further, the BOT recommendation event indicates that the current user has abandoned a transaction with the current BOT, or is likely to abandon the transaction with the current BOT.

According to a fourteenth aspect, the transaction performed by the current user corresponds to an interaction between the current user and a current BOT, wherein the current BOT corresponds to a computer-implemented agent that provides a service to the current user. The hardware logic circuitry further includes an abandonment-determination component that is configured to: receive one or more current-transaction implicit quality signals produced in a course of interaction between the current user and the current BOT; and use decision logic to map the current-transaction implicit quality signal(s) to an output result that constitutes the recommendation event.

According to a fifteenth aspect, the hardware logic circuitry further includes a search engine that is configured to: receive an input query from the current user; and identify at least one selected BOT in the collection of BOTs by matching the input query against information pertaining to a group of available BOTs, to provide a search result. The identifying operation is based, in part, on the implicit quality signals provided in the signal data store. The search engine is further configured to send another electronic message to the user computing device associated with the current user, the other electronic message conveying the search result.

According to a sixteenth aspect, a method is described for assisting users in interacting with BOTs. The method includes receiving one or more current-transaction implicit quality signals produced in a course of interaction between a current user and a current BOT. The current BOT corresponds to a computer-implemented agent that provides a service to the current user, and each current-transaction implicit quality signal reflects a quality of service provided by the current BOT to the current user. The method further includes: using an abandonment-determination component to map the current-transaction implicit quality signal(s) to an output result, the output result constituting a BOT-recommendation event; in response to the BOT-recommendation event, identifying, using a recommendation engine, at least one recommended BOT in a collection of BOTs, to provide a recommendation result; sending an electronic message to a user computing device associated with the current user, the electronic message conveying the recommendation result; and invoking a selected BOT in response to a BOT activation event.

According to a seventeenth aspect, dependent on the sixteenth aspect, the abandonment-determination component and/or the recommendation engine includes logic that performs its function based, at least in part, on implicit quality signals provided in a signal data store. The implicit quality signals provided in the signal data store reflect quality of service provided by a collection of BOTs to a group of users, and the BOTs correspond to computer-implemented agents that provide respective services to the group of users.

According to an eighteenth aspect, dependent on the seventeenth aspect, the implicit quality signals in the signal data store are provided over a span of time by capturing transaction information related to transaction-related events that occur over a course of communication between the group of users and the BOTs. Further, the implicit quality signals in the signal data store include: one of more user-behavior implicit signals, each of which describes one or more actions taken by a given user in interacting with a given BOT, and each of which has an implicit bearing on quality of service provided by the given BOT; and one of more BOT-behavior implicit signals, each of which describes one or more actions taken by the given BOT in interacting with the given user, and each of which has an implicit bearing on quality of service provided by the given BOT.

According to a nineteenth aspect, a computer-readable storage medium for storing computer-readable instructions is described. The computer-readable instructions, when executed by one or more hardware processors, perform a method that includes: providing implicit quality signals over a span of time that reflect quality of service provided by a collection of BOTs to a group of users; and storing the implicit quality signals in a signal data store. The BOTs correspond to computer-implemented agents that provide respective services to the group of users. The providing operation involves capturing transaction information related to transaction-related events that occur over a course communication between the group of users and the BOTs. The implicit quality signals include at least: one of more user-behavior implicit signals, each of which describes one or more actions taken by a given user in interacting with a given BOT, and each of which has an implicit bearing on quality of service provided by the given BOT; and one of more BOT-behavior implicit signals, each of which describes one or more actions taken by the given BOT in interacting with the given user, and each of which has an implicit bearing on quality of service provided by the given BOT. The method further includes: training a machine-trained model based on the implicit quality signals; and transferring the machine-trained model to a signal-utilizing component for use by the signal-utilizing component.

According to a twentieth aspect, dependent on the nineteenth aspect, the signal-utilizing component is one of: a search engine; or a recommendation engine; or an abandonment-determination component that determines when a current user has abandoned a current transaction with a current BOT, or is likely to abandon the current transaction the current BOT.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing/anonymizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for assisting users in interacting with BOTs, comprising:
   hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates, the operations including:
   detecting a BOT-recommendation event in a course of a transaction performed by a current user;
   in response to the BOT-recommendation event, identifying, using a recommendation engine provided by the hardware logic circuitry, at least one recommended BOT in a collection of BOTs, to provide a recommendation result,
   said identifying being based, in part, on implicit quality signals provided in a signal data store; and
   sending an electronic message to a user computing device associated with the current user, the electronic message conveying the recommendation result provided by the recommendation engine,
   the implicit quality signals in the signal data store being provided in a signal-providing process, performed by the hardware logic circuitry, which involves:
      providing the implicit quality signals over a span of time that reflect quality of service provided by the collection of BOTs to a group of users in a course of performing transactions; and
      storing the implicit quality signals in the signal data store,
      the BOTs corresponding to computer-implemented agents that provide respective services to the group of users,
      said providing involving capturing transaction information related to transaction-related events that occur over a course of communication between the group of users and the BOTs, and the implicit quality signals including at least:
one of more user-behavior implicit signals, each of which describes one or more actions taken by a given user in interacting with a given BOT, and each of which has an implicit bearing on quality of service provided by the given BOT; and
one of more BOT-behavior implicit signals, each of which describes one or more actions taken by the given BOT in interacting with the given user, and each of which has an implicit bearing on quality of service provided by the given BOT,
wherein the transaction performed by the current user corresponds to an interaction between the current user and a current BOT,
wherein the current BOT corresponds to a computer-implemented agent that provides a service to the current user, and
wherein the hardware logic circuitry further includes an abandonment-determination component that is configured to:
receive one or more current-transaction implicit quality signals produced in a course of the interaction between the current user and the current BOT, each current-transaction implicit quality signal having an implicit bearing on quality of service provided by the current BOT to the current user; and
use decision logic provided by the hardware logic circuitry to map said one or more current-transaction implicit quality signals to an output result that constitutes the BOT-recommendation event, wherein the BOT-recommendation event indicates that the current user has abandoned the transaction with the current BOT, or is likely to abandon the transaction with the current BOT,
the decision logic generating the output result based, at least in part, on the implicit quality signals provided in the signal data store,
said at least one recommended BOT identified by the recommendation engine being different from the current BOT.

2. The one or more computing devices of claim 1, wherein one user-behavior implicit signal is a user response time signal that describes an amount of time that the given user takes to respond to the given BOT, with respect to one or more opportunities for response.

3. The one or more computing devices of claim 1, wherein one user-behavior implicit signal is a help activation signal that indicates whether the given user has activated a help service in a course of interacting with the given BOT.

4. The one or more computing devices of claim 1, wherein one user-behavior implicit signal is a message repetition signal that indicates a number of times that the given user has repeated a same electronic message in a course of performing a transaction with the given BOT.

5. The one or more computing devices of claim 1, wherein one BOT-behavior implicit signal is a BOT response time signal that describes an amount of time that the given BOT takes to respond to the given user, with respect to one or more opportunities for response.

6. The one or more computing devices of claim 1, wherein one BOT-behavior implicit signal is a delegation signal that indicates whether the given BOT has contacted a human in a course of a transaction with the given user for assistance in resolving an issue that arises within the transaction.

7. The one or more computing devices of claim 1, wherein the implicit quality signals further include one of more transaction-summary implicit signals, each of which provides a summary of at least one complete multi-turn transaction between the given user and the given BOT.

8. The one or more computing devices of claim 7, wherein one transaction-summary implicit signal is a number-of-turns signal that describes a number of turns in at least one transaction between the given user and the given BOT.

9. The one or more computing devices of claim 1, wherein the hardware logic circuitry further includes a search engine that is configured to:
receive an input query from the current user;
identify at least one selected BOT in the collection of BOTs by matching the input query against information pertaining to a group of available BOTs, to provide a search result,
said identifying being based, in part, on the implicit quality signals provided in the signal data store; and
send another electronic message to the user computing device associated with the current user, the other electronic message conveying the search result.

10. The one or more computing devices of claim 1, wherein said capturing transaction information is performed, at least in part, by a BOT platform that hosts at least one BOT, the BOT platform intercepting transaction information that passes between the given user and the given BOT.

11. The one or more computing devices of claim 1, wherein said capturing transaction information is performed, at least in part, by an external computing system that is external to the given BOT, the external computing system receiving the transaction information from the given BOT.

12. The one or more computing devices of claim 1, wherein said capturing transaction information is performed, at least in part, by a user computing device operated by the given user, the user computing device forwarding the transaction information to a system that provides the signal data store.

13. The one or more computing devices of claim 1, wherein said capturing transaction information is performed, at least in part, by the given BOT.

14. The one or more computing devices of claim 1, wherein the abandonment-determination component includes a machine-trained model that is trained based on a training data set, the training data set including features associated with the transactions performed between the group of users and the BOTs, together with evidence of whether these transactions culminated in abandonment of the transactions, the features including the implicit quality signals provided in the signal data store.

15. The one or more computing devices of claim 1, wherein the recommendation engine identifies a recommended BOT by determining a score for the recommended BOT that reflects an extent to which the recommended BOT is a suitable replacement for the current BOT, the score being based, at least in part, on the implicit quality signals in the signal data store.

16. A method for assisting users in interacting with BOTs, comprising:
receiving one or more current-transaction implicit quality signals produced in a course of interaction between a current user and a current BOT,
the current BOT corresponding to a computer-implemented agent that provides a service to the current user, and each current-transaction implicit quality signal reflecting a quality of service provided by the current BOT to the current user;

using an abandonment-determination component provided by hardware logic circuitry to map said one or more current-transaction implicit quality signals to an output result, the output result constituting a BOT-recommendation event, wherein the BOT-recommendation event indicates that the current user has abandoned a transaction with the current BOT, or is likely to abandon the transaction with the current BOT;

in response to the BOT-recommendation event, identifying, using a recommendation engine provided by the hardware logic circuitry, at least one recommended BOT in a collection of BOTs as a replacement to the current BOT, to provide a recommendation result, said at least one recommended BOT that is identified being different from the current BOT;

sending an electronic message to a user computing device associated with the current user, the electronic message conveying the recommendation result; and invoking a selected BOT in response to a BOT activation event.

17. The method of claim 16, wherein the abandonment-determination component and the recommendation engine include logic provided by the hardware logic circuitry that performs its function based, at least in part, on implicit quality signals provided in a signal data store, the implicit quality signals provided in the signal data store reflecting quality of service provided by a collection of BOTs to a group of users, and the BOTs corresponding to computer-implemented agents that provide respective services to the group of users.

18. The method of claim 17, wherein the implicit quality signals in the signal data store are provided over a span of time by capturing transaction information related to transaction-related events in communication between the group of users and the BOTs in a course of performing transactions, and wherein the implicit quality signals in the signal data store include:
  one of more user-behavior implicit signals, each of which describes one or more actions taken by a given user in interacting with a given BOT, and each of which has an implicit bearing on quality of service provided by the given BOT; and
  one of more BOT-behavior implicit signals, each of which describes one or more actions taken by the given BOT in interacting with the given user, and each of which has an implicit bearing on quality of service provided by the given BOT.

19. A computer-readable storage medium for storing computer-readable instructions, the computer-readable instructions, when executed by one or more hardware processors, performing a method that comprises:

providing implicit quality signals over a span of time that reflect quality of service provided by a collection of BOTs to a group of users in a course of performing transactions;

storing the implicit quality signals in a signal data store, the BOTs corresponding to computer-implemented agents that provide respective services to the group of users, said providing involving capturing transaction information related to transaction-related events that occur over a course communication between the group of users and the the implicit quality signals including at least:
  one of more user-behavior implicit signals, each of which describes one or more actions taken by a given user in interacting with a given BOT, and each of which has an implicit bearing on quality of service provided by the given BOT; and
  one of more BOT-behavior implicit signals, each of which describes one or more actions taken by the given BOT in interacting with the given user, and each of which has an implicit bearing on quality of service provided by the given BOT;

training a machine-trained model based, at least in part, on a training data set, the training data set including features associated with the transactions performed between the group of users and the collection of BOTs, together with evidence of whether these transactions culminated in abandonment of the transactions, the features including the implicit quality signals provided in the signal data store; and transferring the machine-trained model to an abandonment-determination component for use by the abandonment-determination component in determining whether a current user has abandoned a transaction with a current BOT, or is likely to abandon the transaction with the current BOT, the abandonment-determination component being implemented by the computer-readable instructions stored on the computer-readable storage medium, wherein the abandonment-determination component triggers a recommendation engine to identify at least one recommended BOT as a replacement to the current BOT, said at least one recommended BOT that is identified being different from the current BOT, the recommendation engine being implemented by the computer-readable instructions stored on the computer-readable storage medium.

* * * * *